United States Patent
McCullough

(10) Patent No.: US 11,439,262 B2
(45) Date of Patent: Sep. 13, 2022

(54) HANDS-FREE UMBRELLA HANDLER

(71) Applicant: Jack McCullough, Trumbull, CT (US)

(72) Inventor: Jack McCullough, Trumbull, CT (US)

( * ) Notice: Subject to any disclaimer, the term of this patent is extended or adjusted under 35 U.S.C. 154(b) by 217 days.

(21) Appl. No.: 16/560,508

(22) Filed: Sep. 4, 2019

(65) Prior Publication Data

US 2020/0085220 A1     Mar. 19, 2020

Related U.S. Application Data

(60) Provisional application No. 62/726,450, filed on Sep. 4, 2018.

(51) Int. Cl.
| | | |
|---|---|---|
| *A47G 25/12* | (2006.01) | |
| *B60R 7/12* | (2006.01) | |
| *B62B 5/00* | (2006.01) | |
| *A47G 29/08* | (2006.01) | |

(52) U.S. Cl.
CPC ............. *A47G 25/12* (2013.01); *A47G 29/08* (2013.01); *B60R 7/12* (2013.01); *B62B 5/00* (2013.01)

(58) Field of Classification Search
CPC .......... B65D 33/14; B62B 5/00; E04H 12/22; A63B 57/20; A47G 29/08; A47G 25/12
USPC ............. 248/312.1, 311.2, 313, 316.1, 316.7
See application file for complete search history.

(56) References Cited

U.S. PATENT DOCUMENTS

| | | | | | |
|---|---|---|---|---|---|
| 1,786,459 | A | * | 12/1930 | Simons ................. | A61J 9/0638 248/104 |
| 2,761,580 | A | * | 9/1956 | Tamboles ............ | A47J 41/0088 215/395 |
| 3,304,035 | A | * | 2/1967 | Davis ...................... | A45B 11/00 248/516 |
| 3,304,036 | A | * | 2/1967 | Davis ...................... | A45B 11/00 248/514 |
| 3,397,867 | A | * | 8/1968 | Van't Hoff ............. | B65D 1/265 366/341 |
| 3,881,677 | A | * | 5/1975 | Ihlenfeld ............ | A47G 23/0225 248/311.2 |
| 4,271,878 | A | * | 6/1981 | Bologa ..................... | B67C 9/00 141/106 |
| 4,596,370 | A | * | 6/1986 | Adkins .................... | B62J 11/00 224/414 |
| 4,629,153 | A | * | 12/1986 | Marcum ............ | A47G 23/0266 108/46 |
| 4,798,413 | A | * | 1/1989 | Capelli .................... | A47C 7/70 297/161 |
| 5,016,845 | A | * | 5/1991 | Pellegrino ............. | A61J 9/0692 248/104 |

(Continued)

*Primary Examiner* — Nkeisha Smith
(74) *Attorney, Agent, or Firm* — Ziegler IP Law Group, LLC

(57) ABSTRACT

A holder for an umbrella includes a base member and a top member. The top member is a resilient member that includes a central opening with slot defined around the opening. A handle for the umbrella can be inserted into the central opening. The base member can include a number of different attachment devices that can be used to attach the holder to an object such as a car or a golf cart. The attachment devices can include magnets or suction cups. The attachment devices can also include a flexible arm. One end of the flexible arm can connect to the holder. The other end can have a connector, such as a claw device. The holder is configured to be connected to an object such as a golf cart, shopping cart or car.

19 Claims, 32 Drawing Sheets

(56) References Cited

U.S. PATENT DOCUMENTS

| | | | | |
|---|---|---|---|---|
| 5,135,189 A * | 8/1992 | Ghazizadeh | ............ | F16M 11/40 248/104 |
| 5,310,155 A * | 5/1994 | Wu | ................ | F16M 13/022 224/274 |
| 5,356,107 A * | 10/1994 | Sinohuiz | ................ | A47C 7/624 248/311.2 |
| 5,489,075 A * | 2/1996 | Ible | ................ | A61J 9/0692 24/298 |
| 5,762,308 A * | 6/1998 | Bryan | .................... | A45B 11/00 135/16 |
| 5,865,412 A * | 2/1999 | Mason | .................... | A47C 7/70 248/311.2 |
| 5,896,880 A * | 4/1999 | Bushweller | ............ | A45B 11/00 135/16 |
| 6,328,047 B1 * | 12/2001 | Lee | .................... | A45B 17/00 135/15.1 |
| 6,328,285 B1 * | 12/2001 | Wiseman | ................ | E04H 3/123 256/59 |
| 6,446,930 B1 * | 9/2002 | Li | ...................... | E04H 12/2238 135/15.1 |
| 6,471,289 B2 * | 10/2002 | Aguilar | ................ | A45B 11/00 135/16 |
| 6,533,237 B1 * | 3/2003 | Matusek | ................ | A45B 11/00 248/291.1 |
| 6,899,388 B1 * | 5/2005 | Enrique | .................... | A47C 7/66 297/129 |
| 7,415,996 B2 * | 8/2008 | Favreau | .................... | A47G 23/0241 141/364 |
| 7,537,016 B1 * | 5/2009 | You | .................... | A45B 3/00 135/16 |
| 7,717,388 B2 * | 5/2010 | Rizzo | .................... | A47G 33/10 248/316.7 |
| 7,731,144 B2 * | 6/2010 | Kazyaka | ................ | B60N 3/107 248/311.2 |
| 8,146,879 B2 * | 4/2012 | Liao | ........................ | B60R 7/12 248/514 |
| 8,439,055 B2 * | 5/2013 | April | .................... | A45B 11/00 135/16 |
| 8,714,511 B2 * | 5/2014 | Zoeteman | ............ | E04H 12/223 248/537 |
| 8,777,072 B2 * | 7/2014 | Christie | ................ | A45B 11/00 224/186 |
| 8,820,336 B1 * | 9/2014 | Schneberger | .......... | A45B 11/00 135/16 |
| 8,960,210 B2 * | 2/2015 | Bacik | .................... | A45B 17/00 135/20.1 |
| 9,027,807 B2 * | 5/2015 | Kampas | .................... | A45F 5/00 224/148.4 |
| 9,259,092 B2 * | 2/2016 | Choi | .................... | A47C 7/624 |
| 9,433,561 B2 * | 9/2016 | Rubinstein | ............ | A61J 9/0661 |
| 9,651,299 B1 * | 5/2017 | Duff | ........................ | F25D 3/08 |
| 9,988,211 B1 * | 6/2018 | Just | ........................ | A61B 50/36 |
| 10,306,960 B2 * | 6/2019 | Patterson | ................ | A45B 25/00 |
| 10,524,546 B2 * | 1/2020 | Votel | .................... | A44B 13/0058 |
| 10,561,249 B2 * | 2/2020 | Doolan | .................... | A47C 4/20 |
| 10,765,185 B1 * | 9/2020 | Wengerd | .................. | F16B 2/10 |
| 10,863,842 B2 * | 12/2020 | Ortiz | .................... | B43M 99/00 |
| 2003/0183815 A1 * | 10/2003 | Wang | .................... | E04H 12/2269 256/65.14 |
| 2010/0078536 A1 * | 4/2010 | Galvin | ............ | B64D 11/00152 248/231.51 |
| 2012/0272614 A1 * | 11/2012 | Perner | .................... | F03D 13/25 52/745.17 |
| 2013/0048693 A1 * | 2/2013 | Chin | .................... | A45B 25/26 224/600 |
| 2013/0256355 A1 * | 10/2013 | Gatto-Weising | ........ | B60R 11/00 224/482 |
| 2015/0305453 A1 * | 10/2015 | Gatto-Weising | ....... | A45B 23/00 248/516 |
| 2016/0309938 A1 * | 10/2016 | Ortiz | .................... | A47G 29/08 |

* cited by examiner

HANDS-FREE UMBRELLA HANDLER

FIELD

The aspects of the disclosed embodiments are directed to an umbrella handler, and in particular, to a hands-free holder for an umbrella that is portable and can be used in a variety of different environments and applications.

BACKGROUND

Umbrellas are well known for their use in protecting a person from environmental elements, such as rain, snow and sun. The typical use of an umbrella involves the person taking the umbrella, opening it and then holding the umbrella over their head. Once the umbrella is open and in use, the person needs to use at least one hand to hold the umbrella in the proper position.

A problem develops when a person is using an umbrella, but then may need both hands to handle an activity. A typical example is when a person is at their car and trying to move objects from a shopping cart into the car. Once the car door is opened, it becomes problematic to hold the umbrella in one hand and easily be able to load the packages or other objects into the car. In most cases, the user has to close up the umbrella and put it aside or have someone else hold it for them. It would be advantageous to be able to attach or mount the umbrella in a manner that frees up a user's hands, but yet still provides a needed degree of protection from the rain, for example.

Another typical example is when a person is at their passenger golf cart trying to ready themselves for their next golf shot; eat or drink while standing; dry off a club in inclement weather; or simply shade themselves from the sun. Any of these or other activities that may require both hands to handle an activity. A parent watching someone get a golf lesson may like some added shade or cover from the weather (sun or rain) while sitting in the cart, but still have their hands free to read, eat, check and respond to email; etc. This same example could be applied to golf cart or Electric Vehicles (EV's) used by consumers in retirement communities; security guards on corporate campus or university, etc. Anywhere an EV or gas operated cart vehicle may be used a hands-free handler for umbrella may be advantageous. It would be advantageous to be able to provide a holder for an umbrella that addresses at least the problems identified above.

SUMMARY

The aspects of the disclosed embodiments are directed to a hands-free holder for a handle of an umbrella. The hands-free holder of the disclosed embodiments is generally configured to hold an umbrella handle together with the umbrella, in a secure manner, generally while the umbrella is in an open state. As will be described further below, the umbrella handle holder is portable in nature so that it can be easily attached, removed and then reattached to the object on which or to which the umbrella holder is mounted.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out herein

BRIEF DESCRIPTION OF THE DRAWINGS

In the following detailed member of the present disclosure, the invention will be explained in more detail with reference to the example embodiments shown in the drawings, in which.

DETAILED DESCRIPTION OF THE DISCLOSED EMBODIMENTS

The aspects of the disclosed embodiments are directed to a holder for an umbrella handle. The holder of the disclosed embodiments is generally configured to securely hold an umbrella handle, and the attached umbrella, in a secure manner, whether the umbrella is in an open state or a closed state. As will be described further below, the umbrella handle holder of the disclosed embodiments is portable in nature so that it can be easily attached, removed and then reattached to the object, such as a golf cart or automobile, on which or to which the umbrella holder is mounted. The umbrella holder of the disclosed embodiments is configured to be attached and secured in one or more of a temporary, removable or permanent manner.

Figure 1:
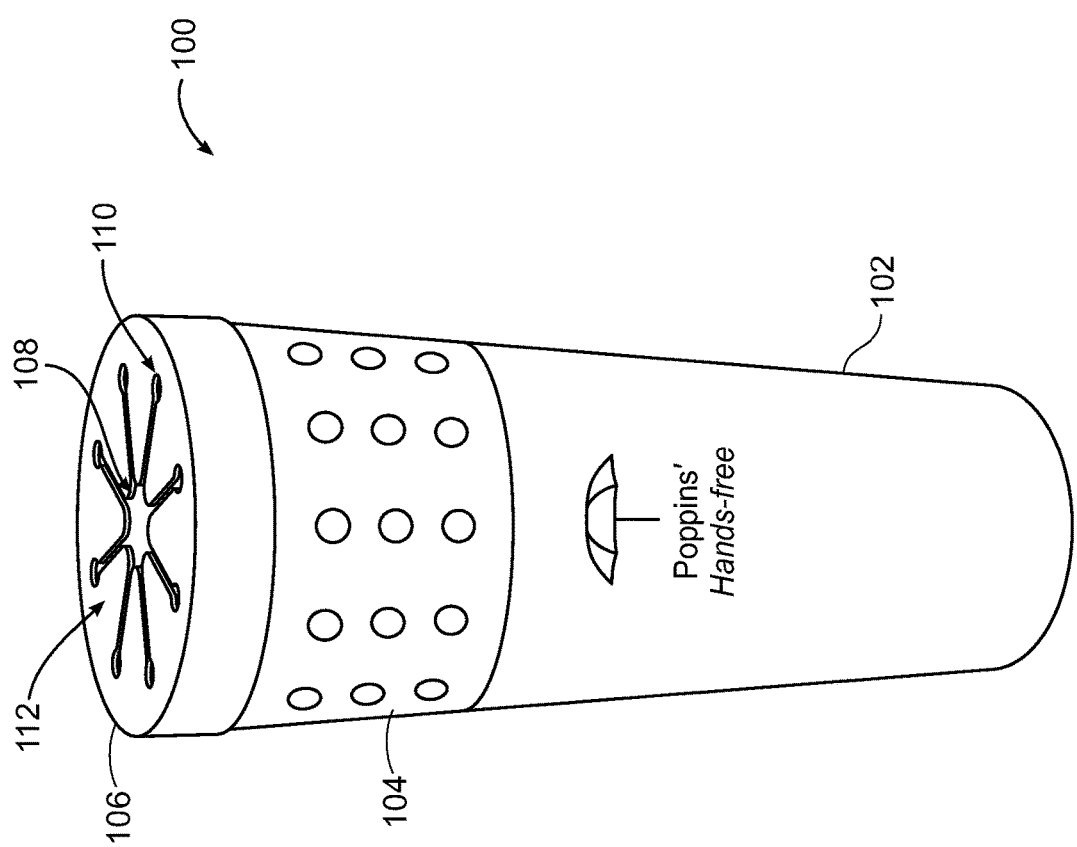
FIG. 1 illustrates a hands-free umbrella holder incorporating aspects of the disclosed embodiments.

FIG. 1 illustrates one example of an umbrella holder 100 incorporating aspects of the disclosed embodiments. In this example, the holder 100 has a cup shape with a bottom or base member 102, a middle or grip member 104 and a top or lid member 106. The top member 106 includes a central opening 108. In one embodiment, the top member 106 includes a number of slits or slots 110 that define or extend away from the central opening 108. The slots 110 are configured to grip the umbrella handle member that is inserted into the opening 108. Although the holder of the disclosed embodiments is generally described herein as comprising three sections, the aspects of the disclosed embodiments are not so limited. In alternate embodiments, the holder 100 can comprise a single member, or two or more members.

The top member 106 is generally flexible in nature that allows a handle of any size to be inserted into the opening. The sections 112 between the slots 110 will then hold and stabilize the umbrella handle firmly in place. In the example of FIG. 1, the sections 112 of the top member 106 between the slits 110 are configured to bend or move up and down as a force is applied. The sections 112 generally form tongue members that press against the umbrella handle when the umbrella handle is inserted into the central opening 108. In one embodiment the sections 112 or tongue members are configured to form-fit around the umbrella shaft for support and positioning. However, the sections 112 are sufficiently resilient to allow the umbrella handle to be removed from the central opening 108 and holder 100 when enough force is applied, such as when the user pulls the umbrella handle out.

The height and diameter of the umbrella holder 100 shown in FIG. 1 is suitably sized to adapt to the average size of an umbrella handle. In alternate embodiments, the height and diameter of the umbrella 100 can be adapted for any sized umbrella handle.

Figure 2:
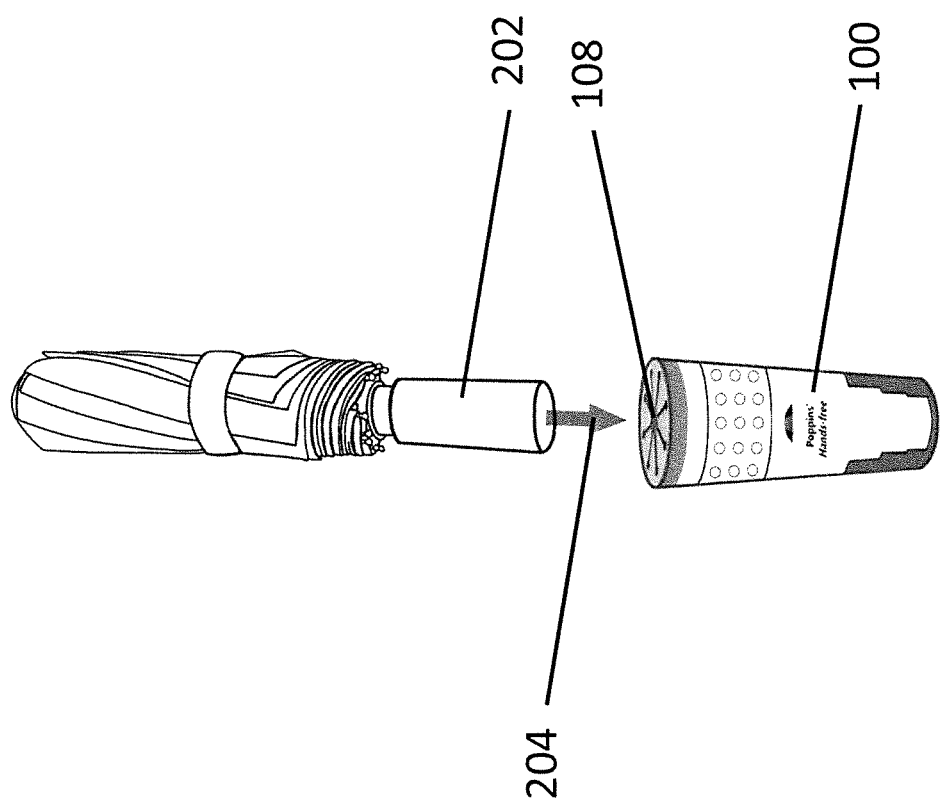
FIG. 2 illustrates an example of how an umbrella handle is inserted into an exemplary hands-free umbrella holder incorporating aspects of the disclosed embodiments.
Figure 3:
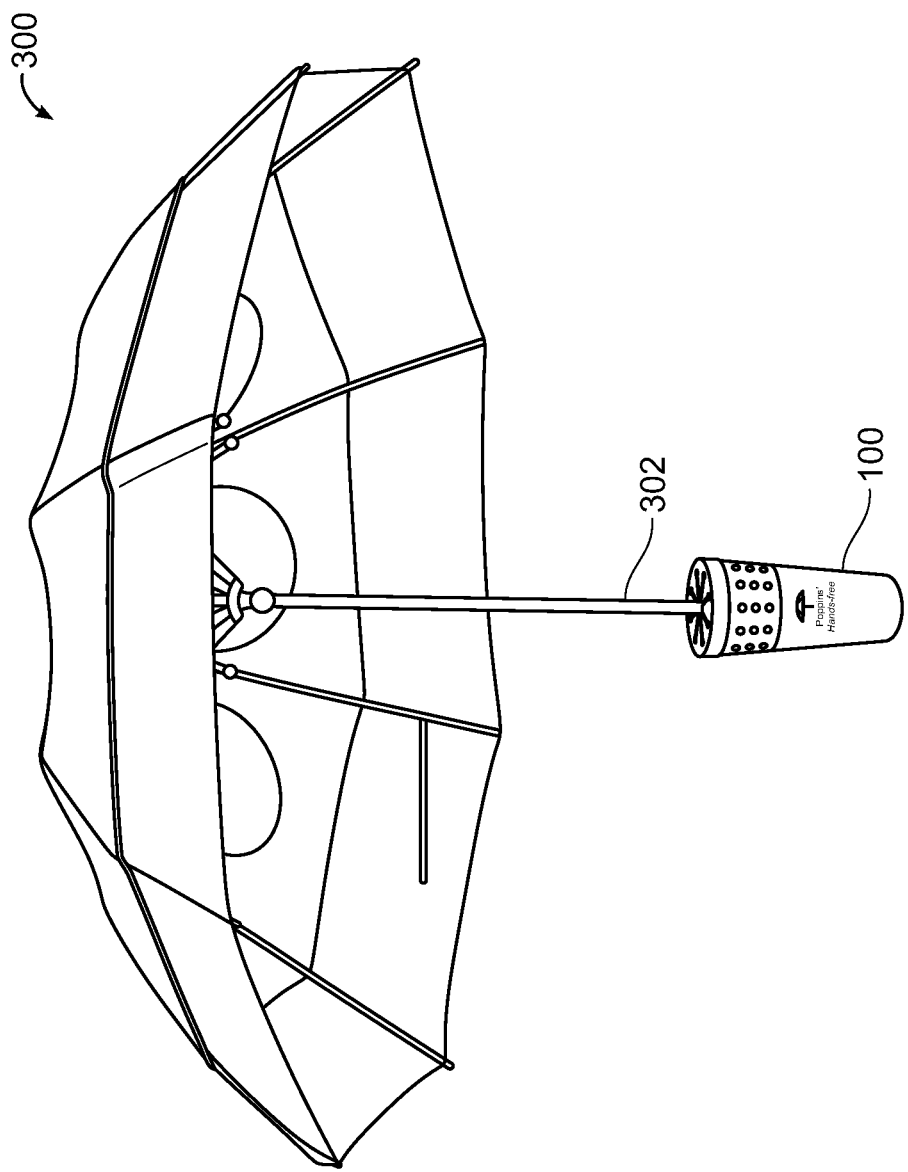
FIG. 3 illustrates an umbrella secured in a hands-free umbrella holder incorporating aspects of the disclosed embodiments.

FIG. 2 illustrates an example of how an umbrella handle 202 would be inserted into the holder 100. To insert the umbrella handle 202 into the holder 100, the handle 202 is moved in the direction of arrow 204 into the opening 108. To remove the umbrella handle 202 from the holder 100, the handle 202 is pulled in a direction opposite to the direction of arrow 204. FIG. 3 illustrates the umbrella 300 in an open state with the handle member 302 inserted into the umbrella holder 100.

Figure 4:
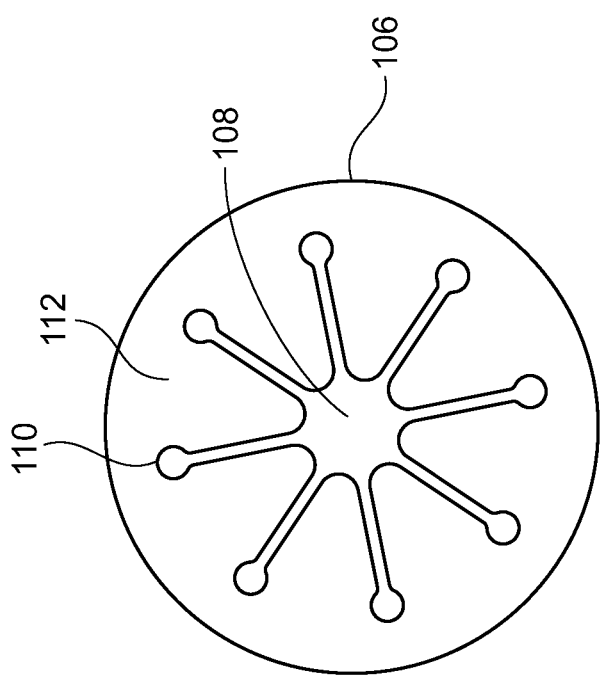
FIG. 4 is a top view of one embodiment of the top member of a hands-free umbrella holder incorporating aspects of the disclosed embodiments.

FIG. 4 is a top view of the top member 106 of the umbrella handle holder. The central opening 108, slotted members 110 and sections 112 between the slotted members 110 are illustrated.

Figure 5:
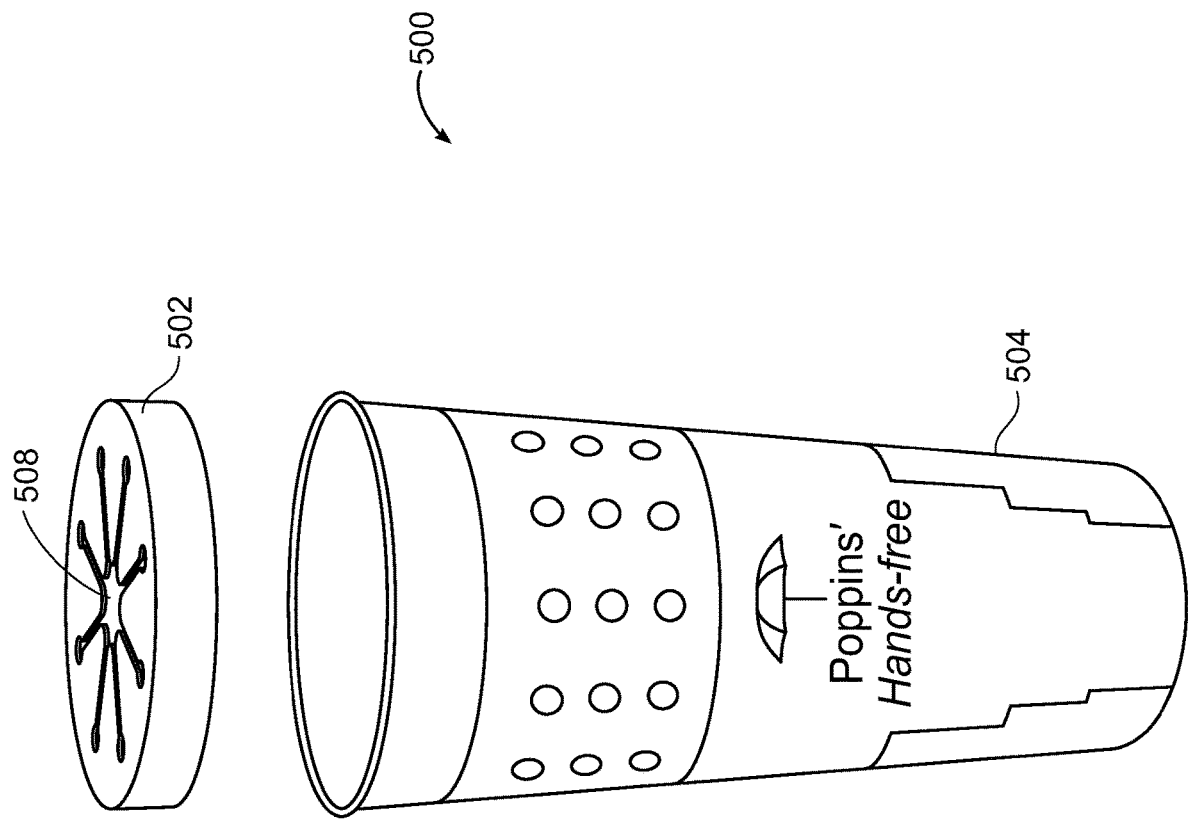
FIG. 5 is a side assembly view of one embodiment of a hands-free umbrella holder incorporating aspects of the disclosed embodiments.

In the example of FIG. 5, the umbrella holder 500 of the disclosed embodiments is formed of two members or sections, a top section 502 and a base section 504. The top member 502 of the umbrella holder 500 in this example is in the form of a lid or cap. As shown in FIG. 5, the top section 502 can be removed from the base section 504 member of the holder 500. In one embodiment, the top section 502 is configured to lock or be locked into position on the base section 504 so as to not detach from the base section 504 each time the umbrella handle is removed from the holder 500. This can be advantageous to be able to provide more options when sizing umbrella handles to the holder 500. For example, the central opening 508 in the example of FIG. 5 could be smaller when working with thinner diameter umbrella handles and larger when dealing with bigger diameter umbrella handles.

Referring again to FIG. 1, the top member 106 will generally comprise a silicone or rubber. The top member 106, which may also be referred to as a sizing insert lid, is generally configured to plug onto the top of the umbrella handle holder 100. This holds and stabilizes the umbrella handle firmly in place, when the umbrella handle is inserted.

Figure 6:
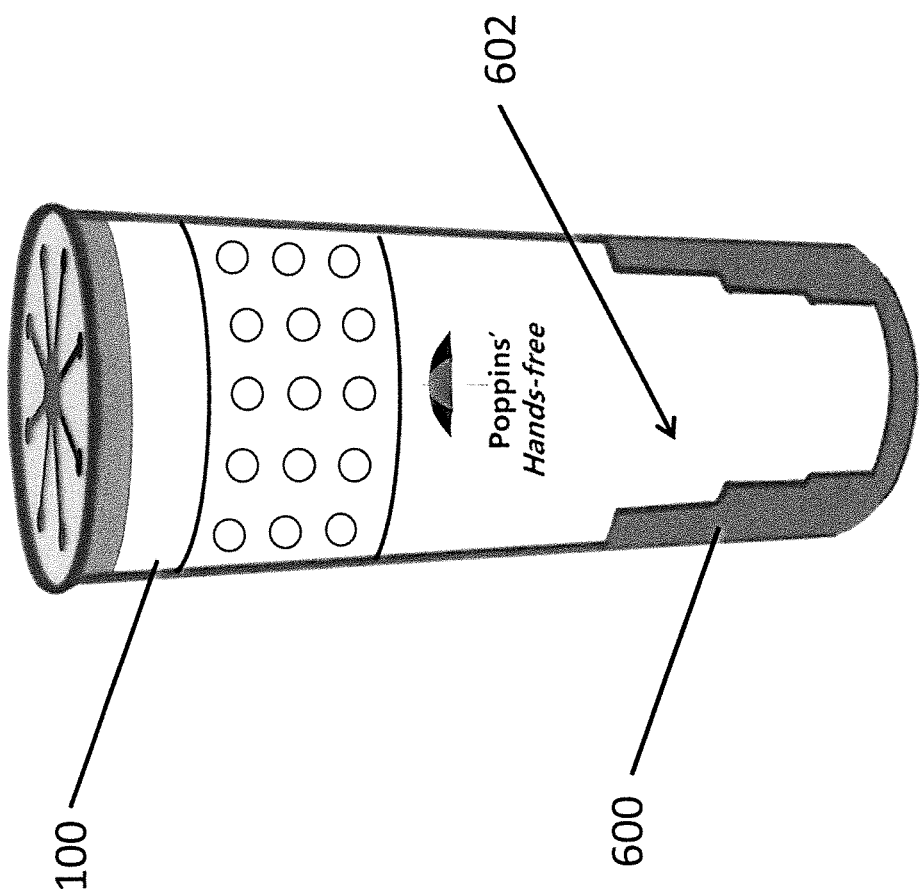
FIG. 6 is a partial cross-sectional view of one embodiment of a hands-free umbrella holder incorporating aspects of the disclosed embodiments.

FIG. 6 illustrates a partial cross-section of one embodiment of an umbrella holder 600 incorporating aspects of the disclosed embodiments. In this example, the interior of the holder 600 includes a molded step interior 602 that includes steps or a stepped section 604. In this example, the interior 602 is a molded plastic that includes a descending stepped interior member or steps 604. The stepped interior member 602 can be removable or non-removable. For example, in one embodiment, the stepped interior 602 is a sleeve that can be removed and replaced with another stepped interior sleeve. This can be useful for different sizes or type of umbrella handles, where different sleeves are configured for different sized handles. The sleeve can be configured to slide into and out of the interior cavity of the holder 600.

The stepped interior 602 is generally a partially flexible and resilient material. In one embodiment, the stepped interior 602 comprises a silicone or rubber material. The stepped interior 602 is configured to securely hold an umbrella handle that is inserted into the holder 600 in place. The different steps can be suitable sized to accommodate umbrella handles of different sizes, diameters and shapes.

In one embodiment, the top cover 106 of the holder 600 comprises a rubber or silicone material. The top cover 106 can also be referred to as the first stability member and the material of the top cover 106 must have some 'give and rebound' to allow an umbrella handle to push-through and into the interior cylinder member of the to reach the second-level 'stability' feature. In the example described herein with respect to FIG. 6, the second level stability features include the molded interior steps 602. In the example of FIG. 6, as well as the example of FIG. 1, the top covers 106, including the central opening 108, slotted members 110 and members 112, are configured for added support and positioning of the umbrella shaft. The stepped section 602 can be used in conjunction with the top cover 106 to provide further stability.

The molded interior steps 604 are configured to provide a guided, descending-size flow to allow the consumer the ability to more firmly place an umbrella handle further into the cylinder member of the holder for added stability. The steps 604 can be molded permanently into the cup or cylinder; or a rubber/silicone material can be used as an insert into the molded cylinder.

The configuration of umbrella handles can include both cylindrically shaped handles as well as J-Hook type handles. The handle holder of the disclosed embodiments is configured to be used with any such umbrellas and handles. In one embodiment, the top member 106 and interior member 600 of the holder 100, or cylinder, can include one or more slots that will allow for the receipt of the J-Hook. In one embodiment, one or more slots or slotted sections that are configured to receive a J-hook style umbrella handle can molded into a side of the interior cylinder. As an example, rather than a stepped member 602, the interior 600 will include a molded rubber or silicone member with a slot that runs from side to side that is configured to receive the J-Hook handle member. In one embodiment slots or openings could be formed or cut into the side of the holder 100 or cylinder. As another example, in one embodiment, a side wall of the holder 100 can include a circular opening that is configured to receive the free end of the J Hook handle member. The umbrella handle can then be moved or positioned so that the other side if the J-Hook handle member is secured against an opposite side wall section of the holder 100.

Figure 7:
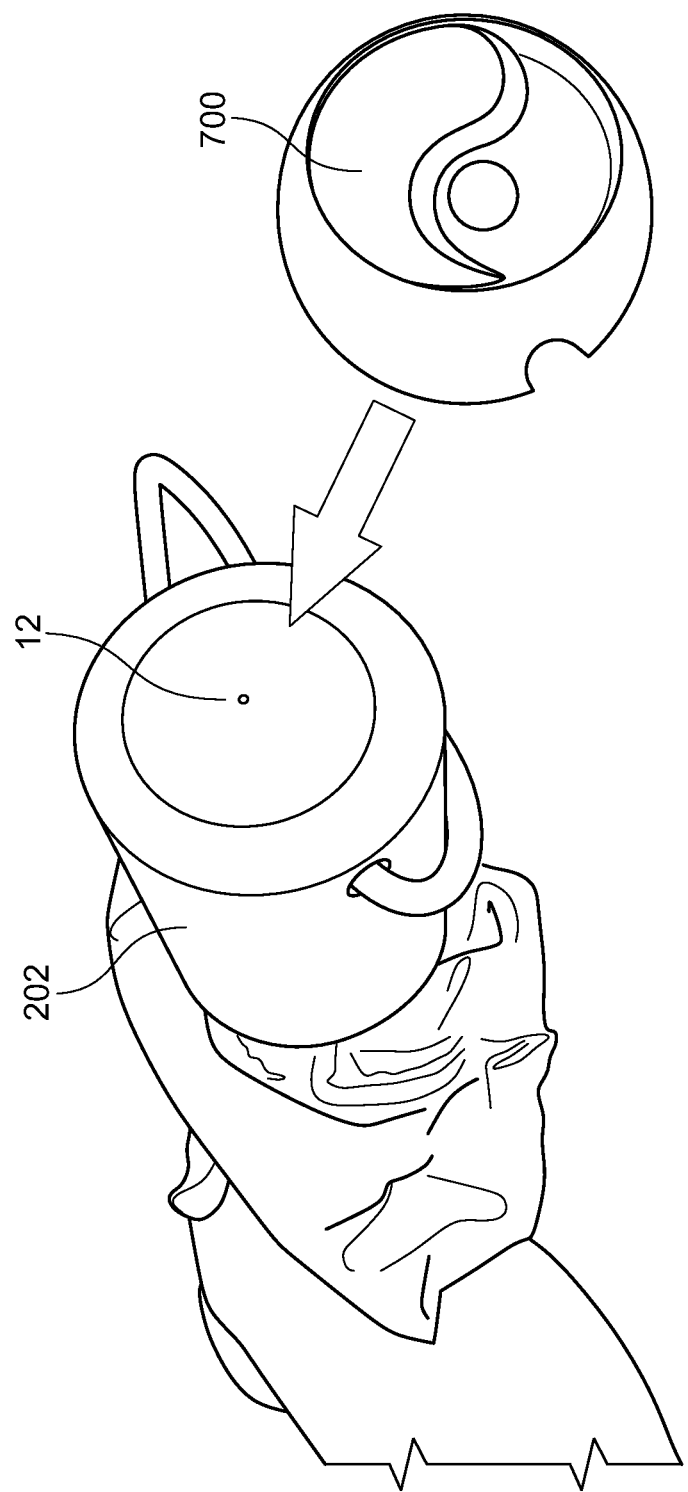
FIG. 7 illustrates one embodiment of an attachment mechanism for connecting an umbrella to a hands-free umbrella holder incorporating aspects of the disclosed embodiments.
Figure 8:
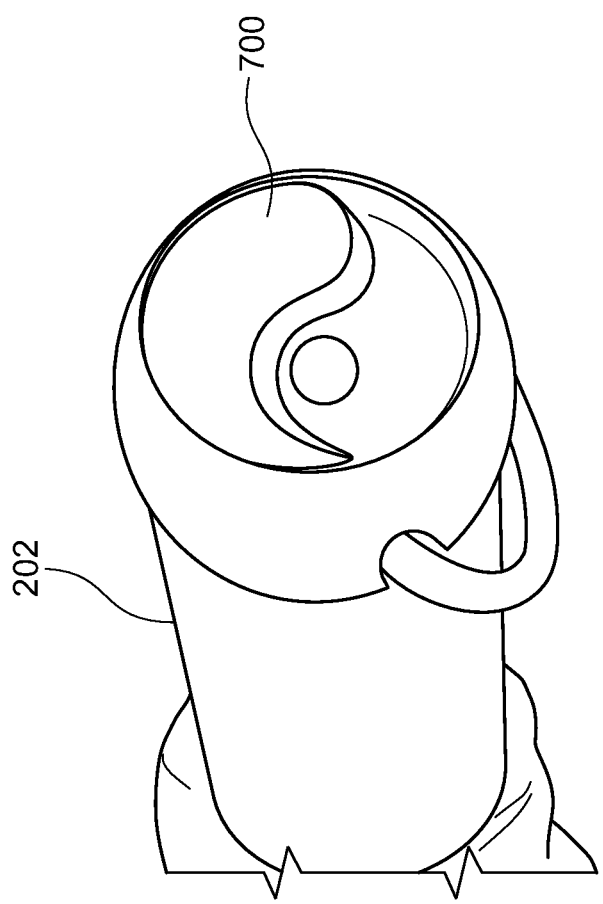
FIG. 8 is in an end view of the attachment mechanism shown in FIG. 7.
Figure 9:
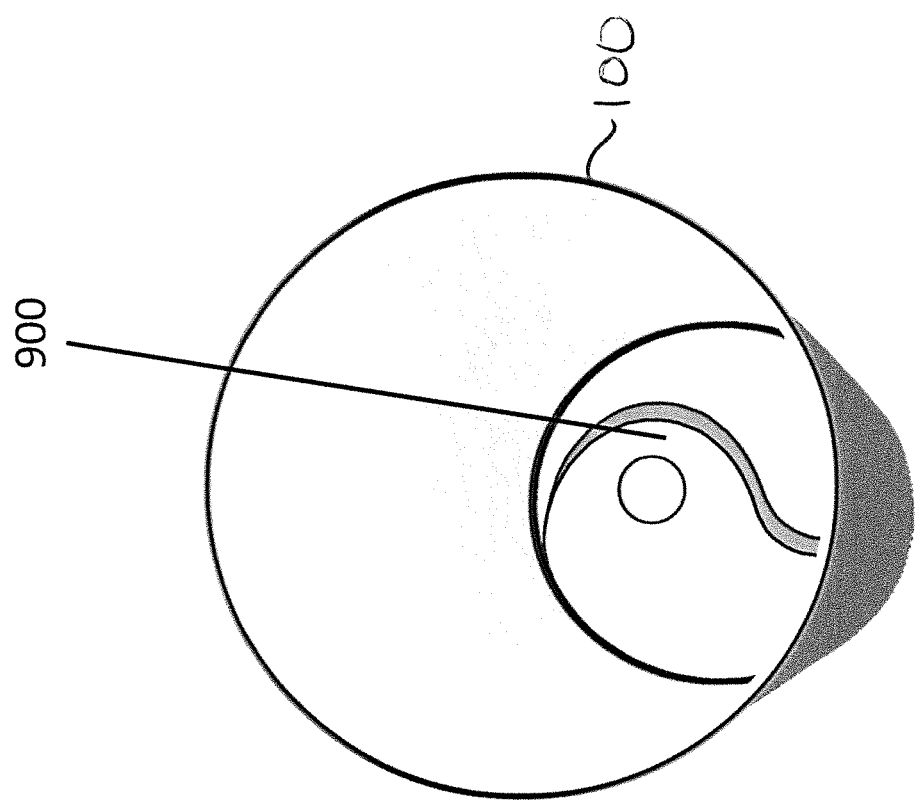
FIG. 9 illustrates one embodiment of a base disposed within the interior of the hands-free umbrella holder that corresponds to the attachment mechanism shown in FIGS. 7 and 8.

Referring to FIG. 9, in one embodiment, the holder 100 includes an interlocking base assembly 900. Referring also to FIGS. 7 and 8, in this example, a complementary portion 700 of the interlocking base assembly 900, also referred to as a Yin-Yang interlocking base or cap, is attached to the bottom member 12 of a handle 202 of an umbrella 10. The portion 700 interlocks with the corresponding base 900 that is disposed within the interior of the holder 100, as is shown in FIG. 9. In this manner, the user needs only insert the umbrella handle 202 with the base 700 into the holder and connect, twist and interlock the bottom of the handle 202 with the base 900. This simple 'plug in' function keeps the umbrella handle 202 securely in place and stabilized while in use with the holder 100.

Thus, the aspects of the umbrella handle holder 100 of the disclosed embodiments provides a unique stabilizing solution. This includes the sizing insert lid 106, molded interior sizing insert 602 with steps 604 and the interlocking base 700, 900, which can be used alone or in any one of a number of combinations together. Each stabilizing option and/or combination (above) provides a secure connection to the umbrella handle, keeping the umbrella handle and umbrella securely in place during use.

In one embodiment, the umbrella handle holder 100 of the disclosed embodiments can also include drainage holes. For example, the drainage holes can be formed or defined in the bottom member of the umbrella handle holder 100. In alternate embodiments, the drainage holes can be defined in any suitable member of the holder 100, other than including the bottom.

The umbrella handle holder 100 of the disclosed embodiments is a hands-free, rain or shine mobile-gear accessory consumer product. With a variety of mounting and armature systems, the holder 100 allows consumers, shoppers, golfers, contractors, livery service providers, commuters, tailgaters, campers, Senior Living Community members and management; University or Business Campus Security and Property Management; food delivery; and more to 'dock' an umbrella while remaining protected; move about; and most importantly able to use BOTH hands to perform tasks outside during inclement weather. In practice the holder 100 allows for a hands-free umbrella experience to perform tasks outside during inclement weather.

In one embodiment, the holder 100 can be configured to temporarily or removably mount on vehicle glass/window (inside or outside vehicle); and on roof or body of vehicle. The mounting possibilities for the holder 100 can include, but are not limited to, suction, magnetic, gripping, clamping and other removable and portable or permanent attachment devices, for example a swivel clamp.

Figure 10:
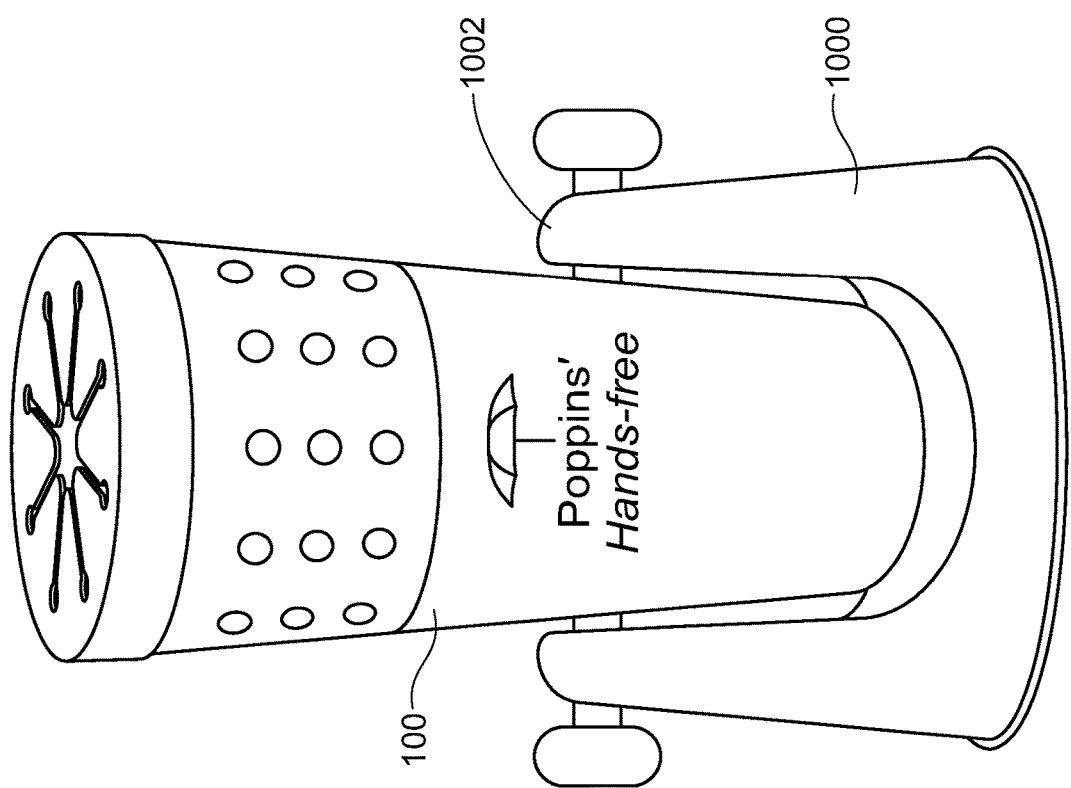
FIG. 10 illustrates one embodiment of a swivel mount for a hands-free umbrella holder of the disclosed embodiments.
Figure 11:
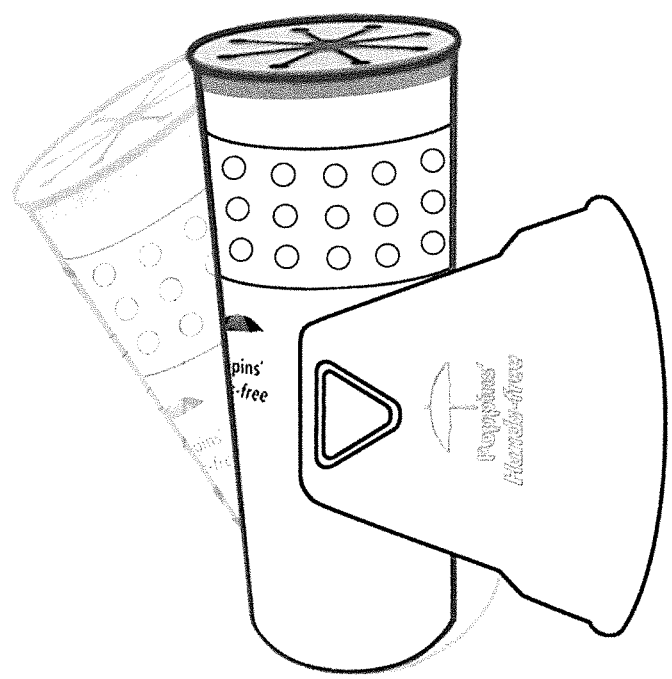
FIG. 11 illustrates how the hands-free umbrella holder of the disclosed embodiments can swivel in the swivel mount.

FIG. 10 illustrates one example of a mount 1000 for the holder 100. In this example, the mount 1000 can be or include a suction or magnetic mount that can be configured to attach to the roof or window of a vehicle, or other similar surface. In one embodiment, the mount 1000 can include a pivot member 1002. This allows the holder 100 to adapt to different positions and orientations while in the mount 1000. The umbrella handle holder 100 can be pivoted to the desired position and locked into place. An example is shown in FIG. 11, where the holder 100 is pivoted approximately 90 degrees from the orientation shown in FIG. 10.

Figure 12:
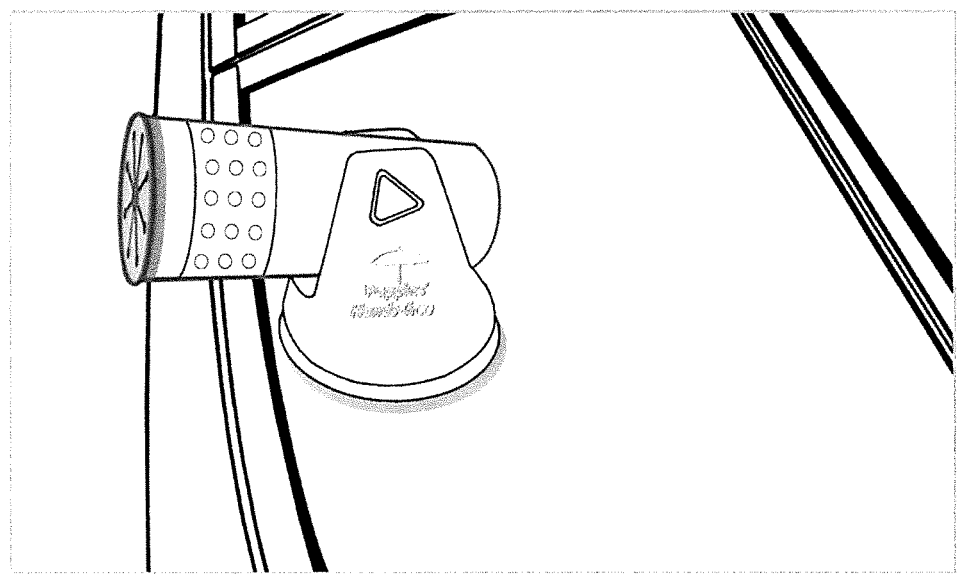
FIG. 12 illustrates the attachment of the swivel mount to the window of a car.
Figure 13:
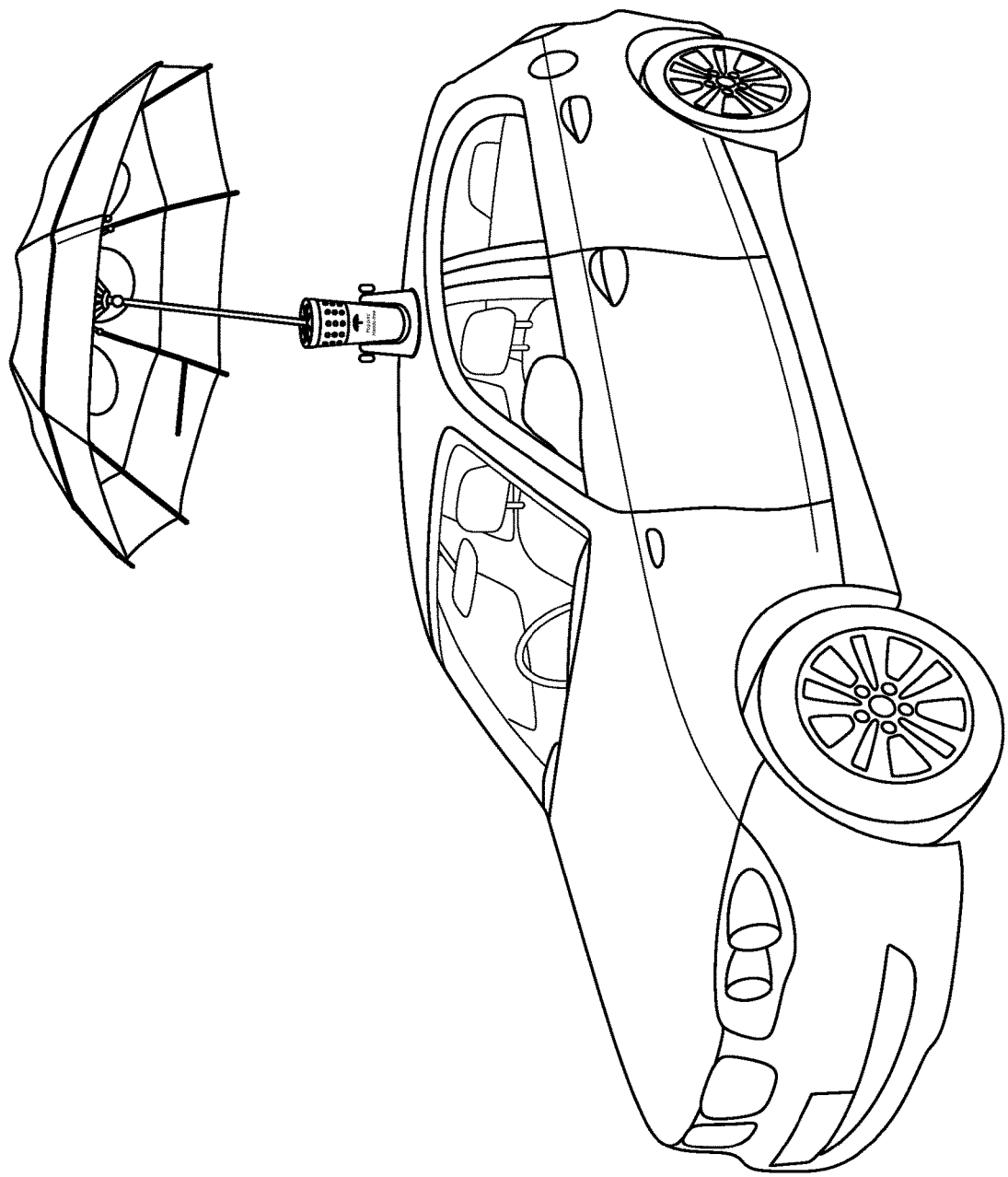
FIG. 13 illustrates the attachment of the swivel mount to a roof of a car.

One application of the mount 1000 of FIG. 10 is shown in FIG. 12. Here, the mount 1000 is attached to the glass of a window of a car. In the example of FIG. 13, the mount 1000 is attached to the roof of the car.

Figure 14:
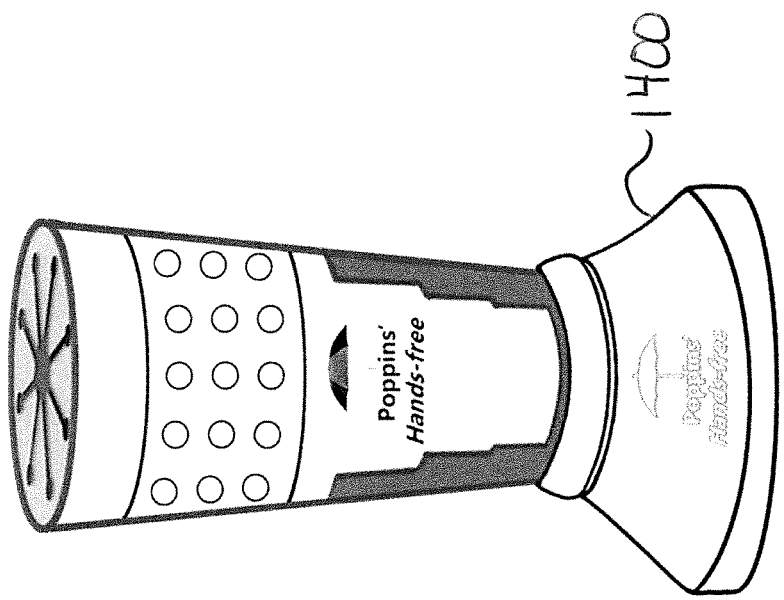
FIG. 14 illustrates one embodiment of a base for a hands-free umbrella holder incorporating aspects of the disclosed embodiments.

FIG. 14 illustrates another example of a portable goes-with-you travel mount 1400 for the umbrella handle holder 100. The mount in the example of FIG. 14 could be a suction mount or magnetic mount. The mount 1400 is secured to the bottom of the umbrella handle holder 100 in a suitable manner.

Figure 15:
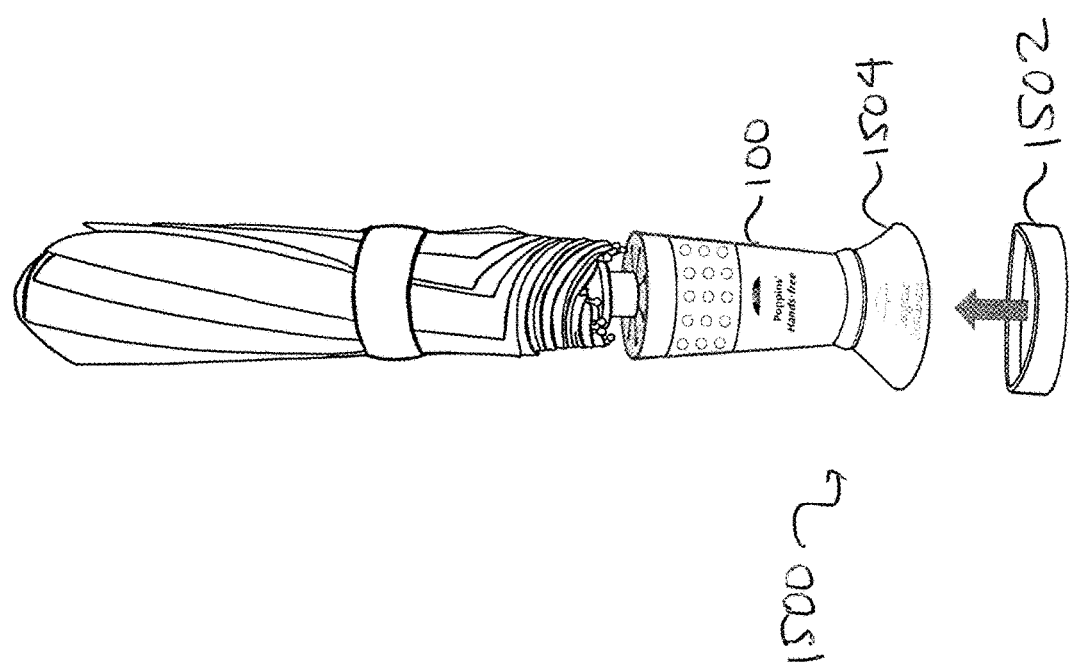
FIG. 15 illustrates an assembly view of one embodiment of the base shown in FIG. 14.
Figure 16:
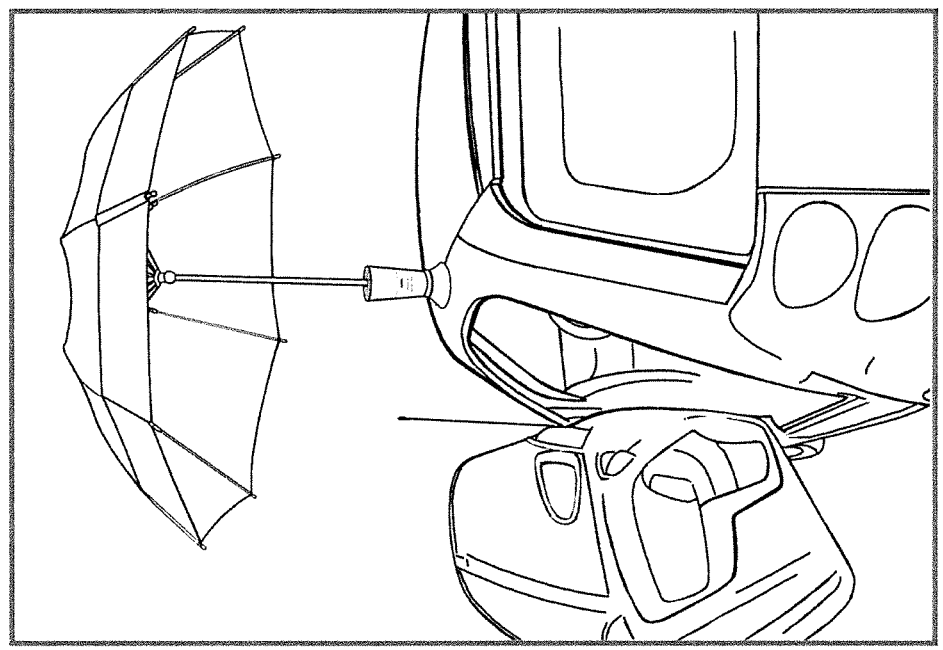
FIG. 16 illustrates the attachment of the base shown in FIG. 14 together with an umbrella mounted on the roof of a car.

In one embodiment, as shown in FIG. 15, the mount 1500 includes a cap member 1502. The cap 1502 can be removed to expose the mounting surface, such as a magnet. The cap 1502 can protect the user's belongings from the magnet. In one embodiment, the mount member 1504 can be a suction cup that is configured to connect to the cap member 1502. FIG. 16 shows the mount 1500 with the umbrella in place disposed on the roof of a car.

In one embodiment, the umbrella handle holder 100 can remain attached to the umbrella handle for ease of portability. In this example, the umbrella holder 100 can be suitably sized or equipped with a gripping member that allows holding the holder 100 with the umbrella secured in the holder 100. In one embodiment, a handle member can be disposed on the outer surface of the umbrella holder 100. An example would be a cup handle or a strap.

Figure 17:
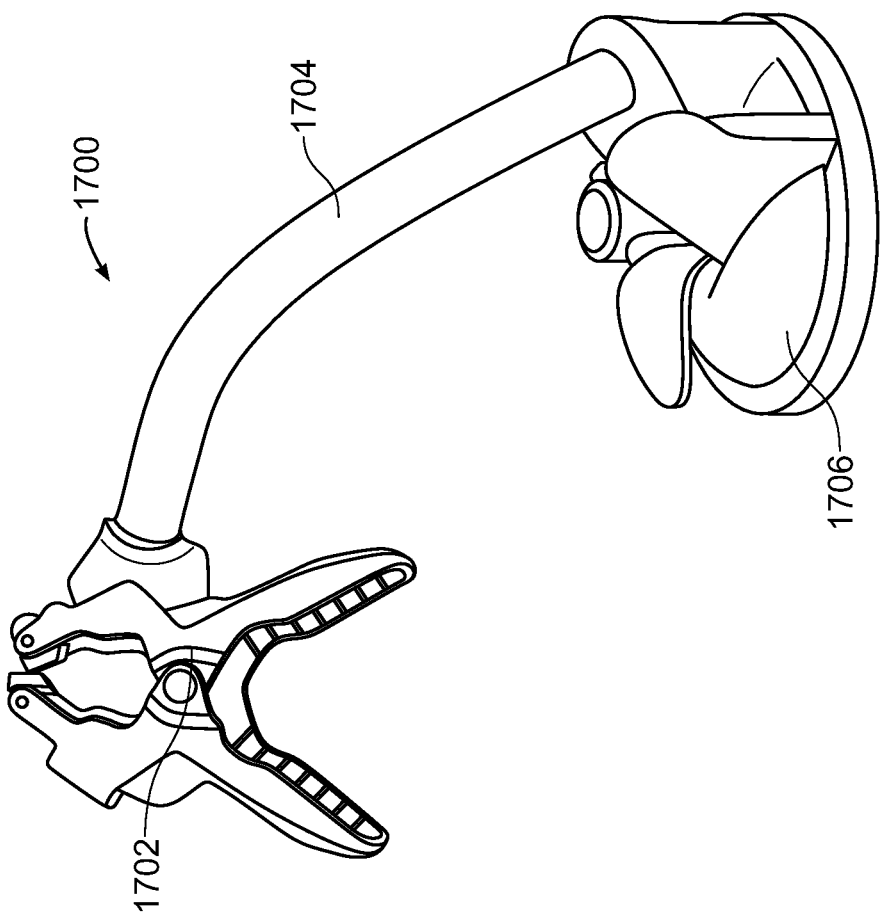
FIG. 17 illustrates another embodiment of a hands-free umbrella holder incorporating aspects of the disclosed embodiments.
Figure 18:
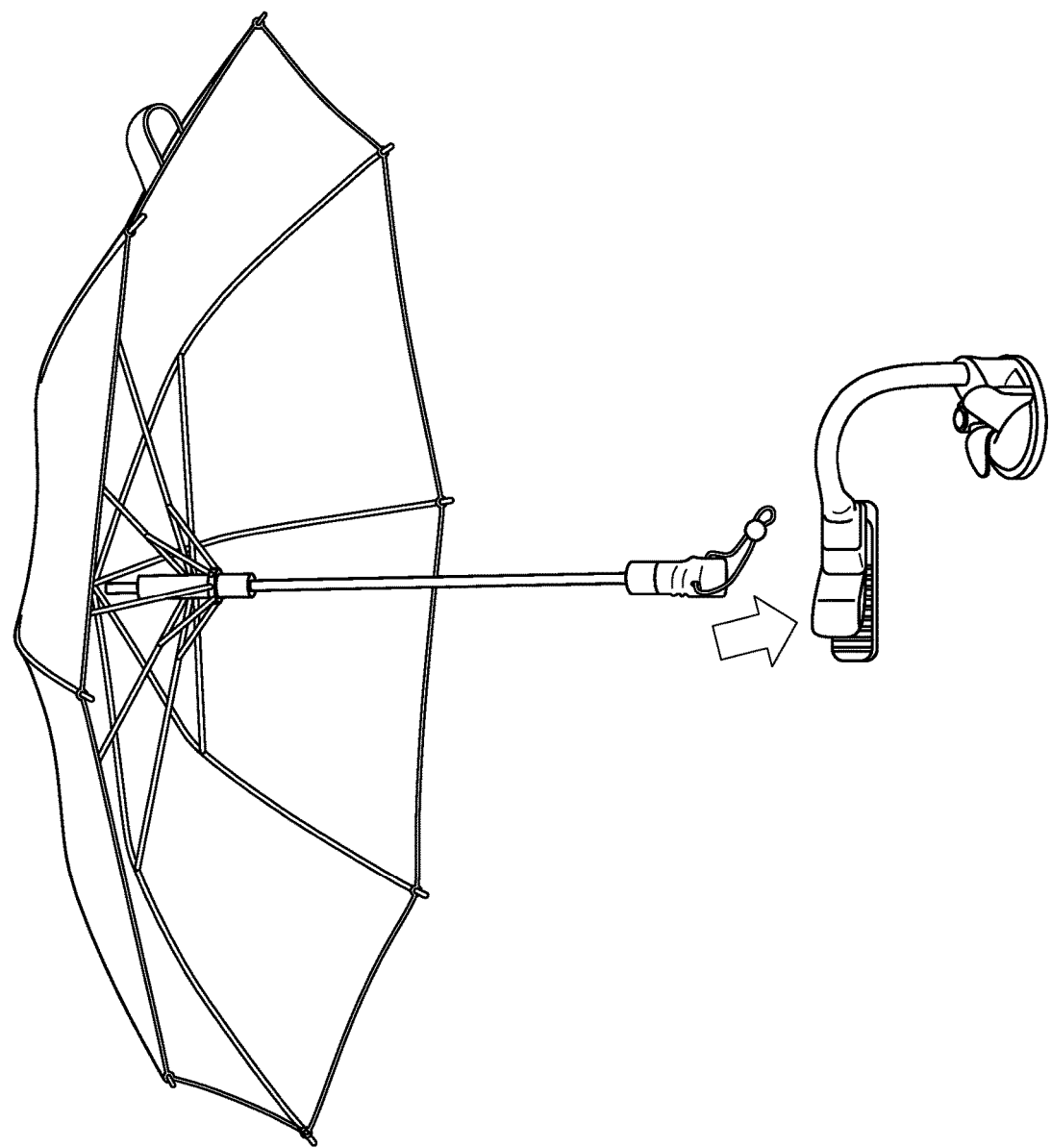
FIG. 18 illustrates the connection of an umbrella to the device shown in FIG. 17.
Figure 19:
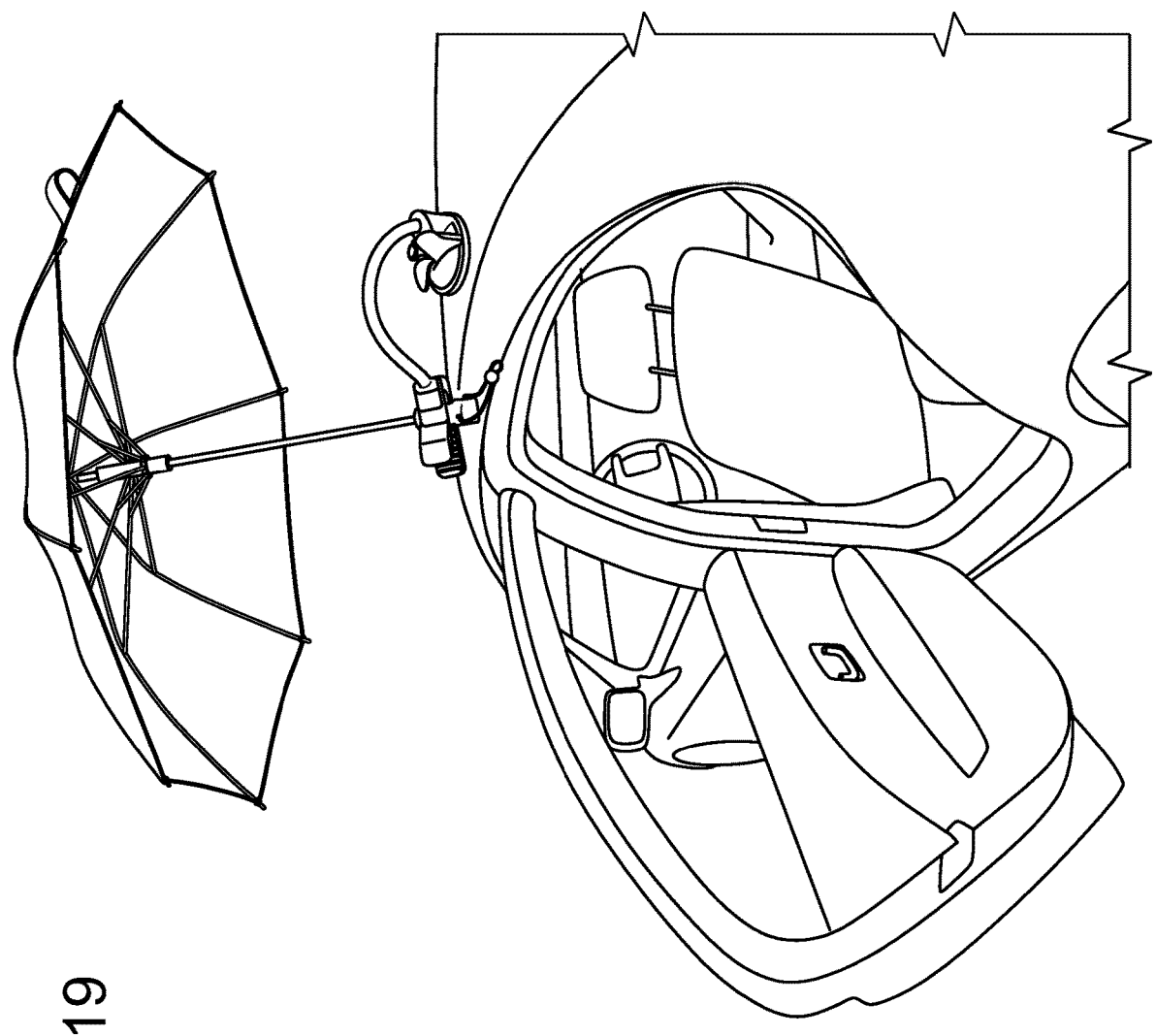
FIG. 19 illustrates the mounting of the device shown in FIG. 17 to the roof of a car.

FIG. 17 illustrates a docking-perching device 1700 that is used to secure the umbrella handle holder 100. In this example, a talon grip member 1702 is attached to an adjustable armature 1704 that secures to your vehicle's windows or roof with a suction or magnetic attachment device or base 1706. As shown in FIGS. 18 and 19, the talon grip 1702 easily and securely grips the umbrella handle, while the umbrella is maintained in a secure position providing needed protection from the rain or other elements.

Figure 20:
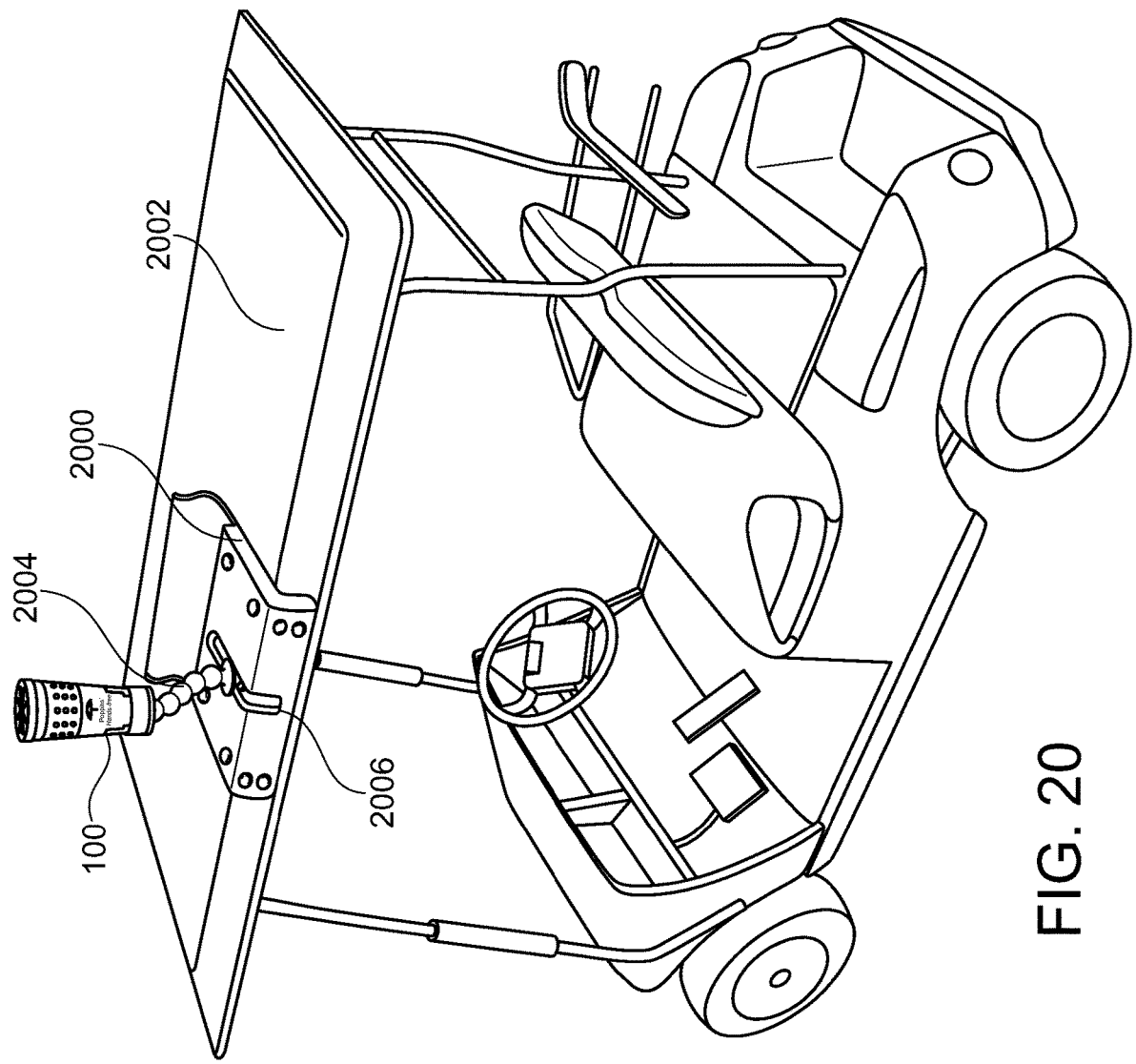
FIG. 20 illustrates another exemplary application of a hands-free umbrella holder incorporating aspects of the disclosed embodiments.
Figure 21:
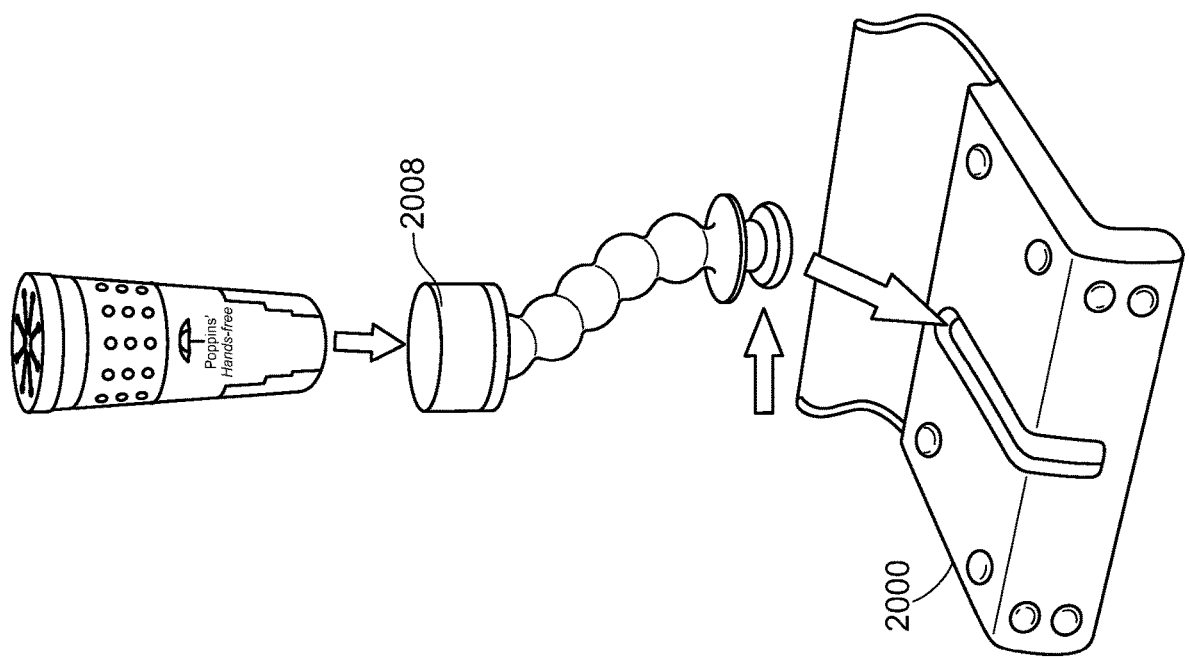
FIG. 21 illustrates an exemplary mounting base for the hands-free umbrella holder shown in FIG. 20.
Figure 22:
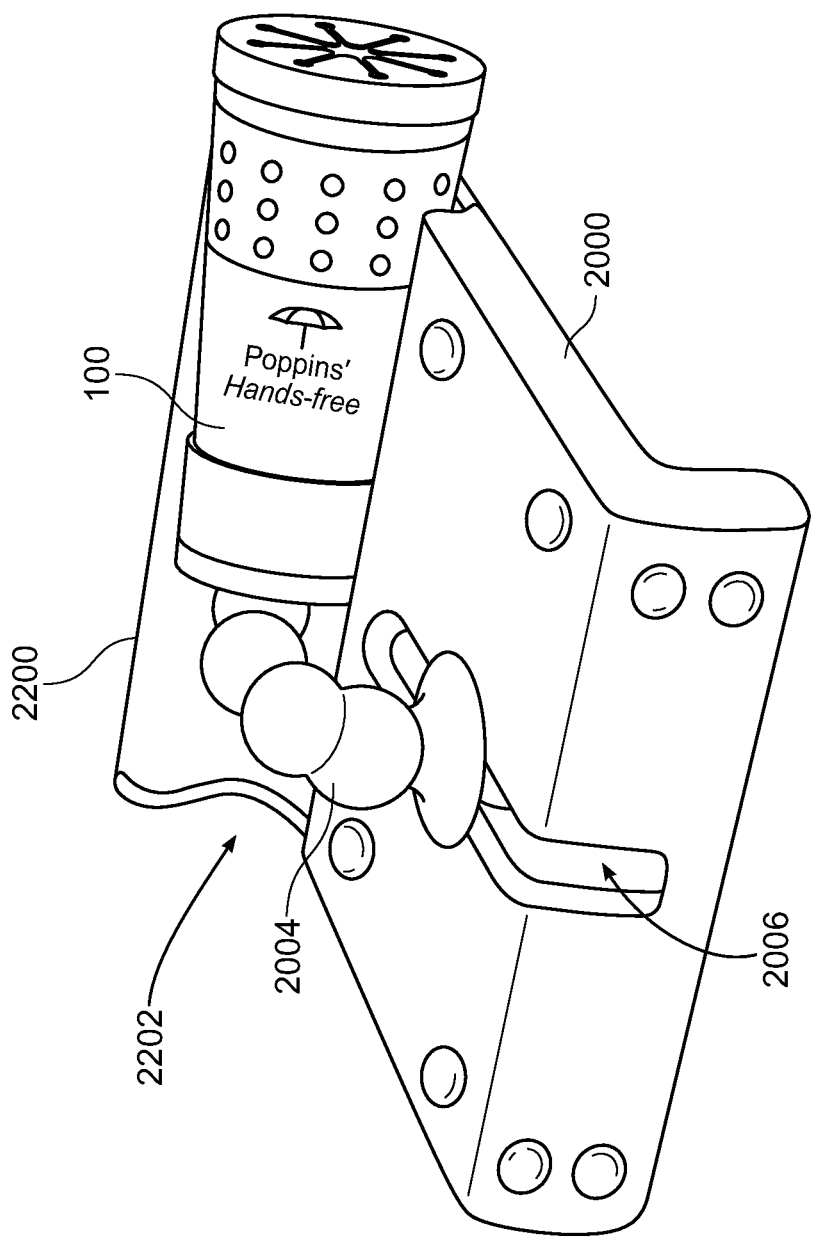
FIG. 22 illustrates the storage of the hands-free umbrella holder on the mount shown in FIG. 20.

The umbrella handle holder 100 of the disclosed embodiments can be used in any one of a number of different applications where it is desired to fully deploy and maintain an open umbrella in a hands-free manner. FIGS. 20-22 illustrate an example of securing the umbrella handle holder 100 to a roof of a golf cart. In this example, a mounting plate 2000 is generally permanently attached to the roof. The holder 100 can be attached to the mounting plate.

The umbrella handle holder 100 can be configured to securely hold an umbrella on the golf cart roof so golfer can stand outside the cart while waiting for next shot; take a practice swing; stretch and stay loose; or load and unload clubs. Simply stated the golfer and/or passenger can stand outside cart or sit inside cart and have added hands-free protection from the weather (rain or sun). The umbrella handle holder 100 is configured to be easily and securely attached (either semi-permanently, permanently or portably) to any golf cart.

As shown in FIGS. 20-22, the golf cart mounting device 2000 is attached to the golf cart roof 2002 in a semi-permanent or permanent manner. In one embodiment, the mounting device 2000, also referred to herein as a plate member, can be secured to the roof 2002 with screws, for example. The device 2000 includes a track or groove 2006 that allows an extension device 2004, such as an arm or gooseneck, to be movably disposed therein. In one embodiment, the one end of the arm 2004 will be configured to slide within the track 2006, as well as be secured in a desired position along the track 2006.

The other end of the arm 2004 is connected to the umbrella handle holder 100. In the example of FIG. 21, the umbrella handle holder 100 is disposed in a cup mount 2008, which is connected to the arm 2004. The user can adjust a position of the umbrella handle holder 100 and arm 2004 within the track 2006 to the desired position. Once in the desired position, the arm 2004 is secured in the track 2006 and the umbrella secured in the umbrella handle holder 100.

Referring to FIG. 22, in one embodiment the umbrella handle holder 100 is configured to fold down when not in use. As is shown in FIG. 22, the mounting device 2000 includes a curved member 2200. The curved member 2200 defines a recess 2202 into which the umbrella handle holder 100 can be received. The arm 2004 in this embodiment is configured to bend to allow the umbrella handle holder 100 to be moved into the recess 2202. In this manner, the umbrella handle holder 100 does not need to be removed from the mounting device 2000.

Figure 23:
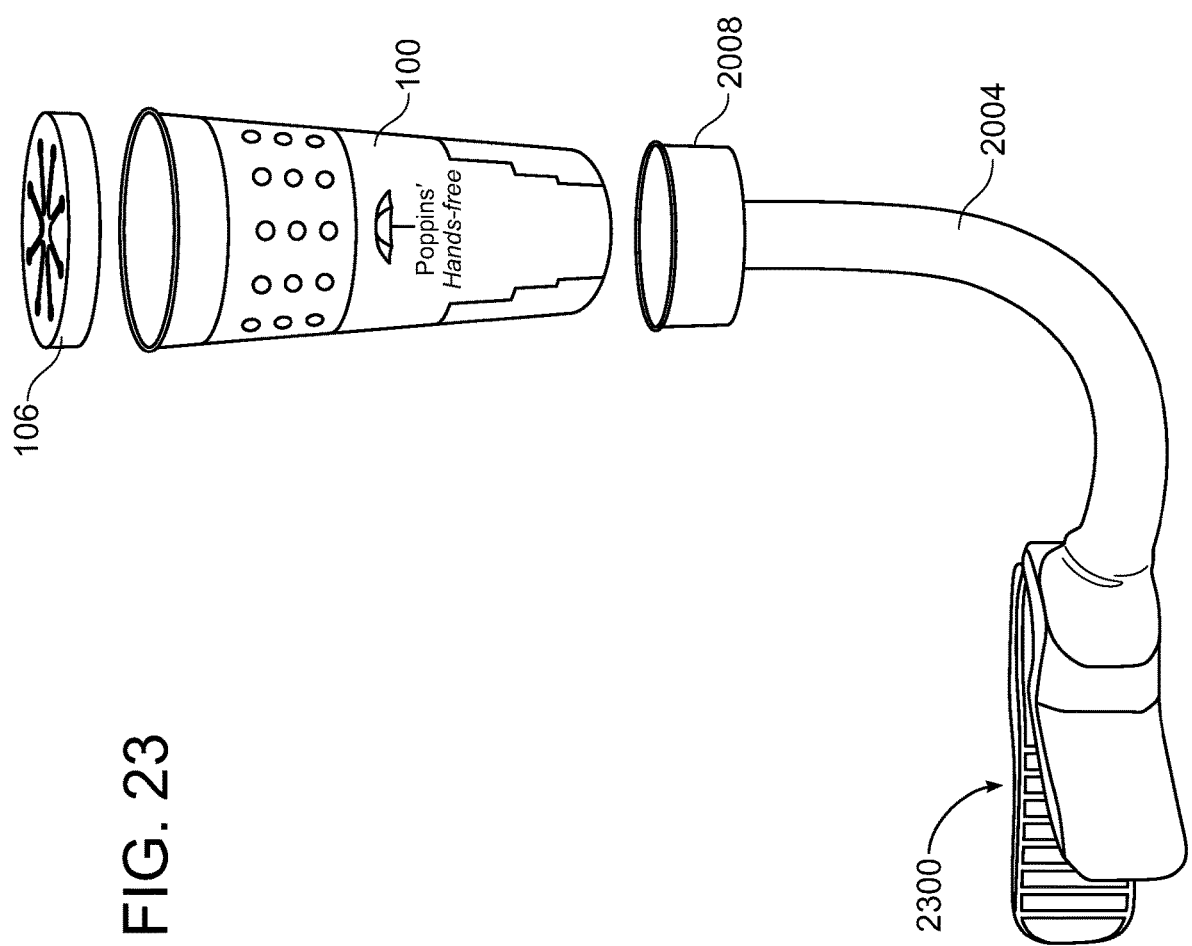
FIG. 23 illustrates another example of a mounting device for a hands-free umbrella holder incorporating aspects of the disclosed embodiments.

In the example of FIG. 23, one end of the arm 2004 is connected to a clip or gripping member 2300. The umbrella handle holder 100 is configured to easily and securely attach (permanently or portably) to, for example, a golf cart. In this manner, the clip member 2300 can be attached to a golf cart frame, suitable arm or post, such as that of a golf cart or grocery/shopping cart.

Figure 24:
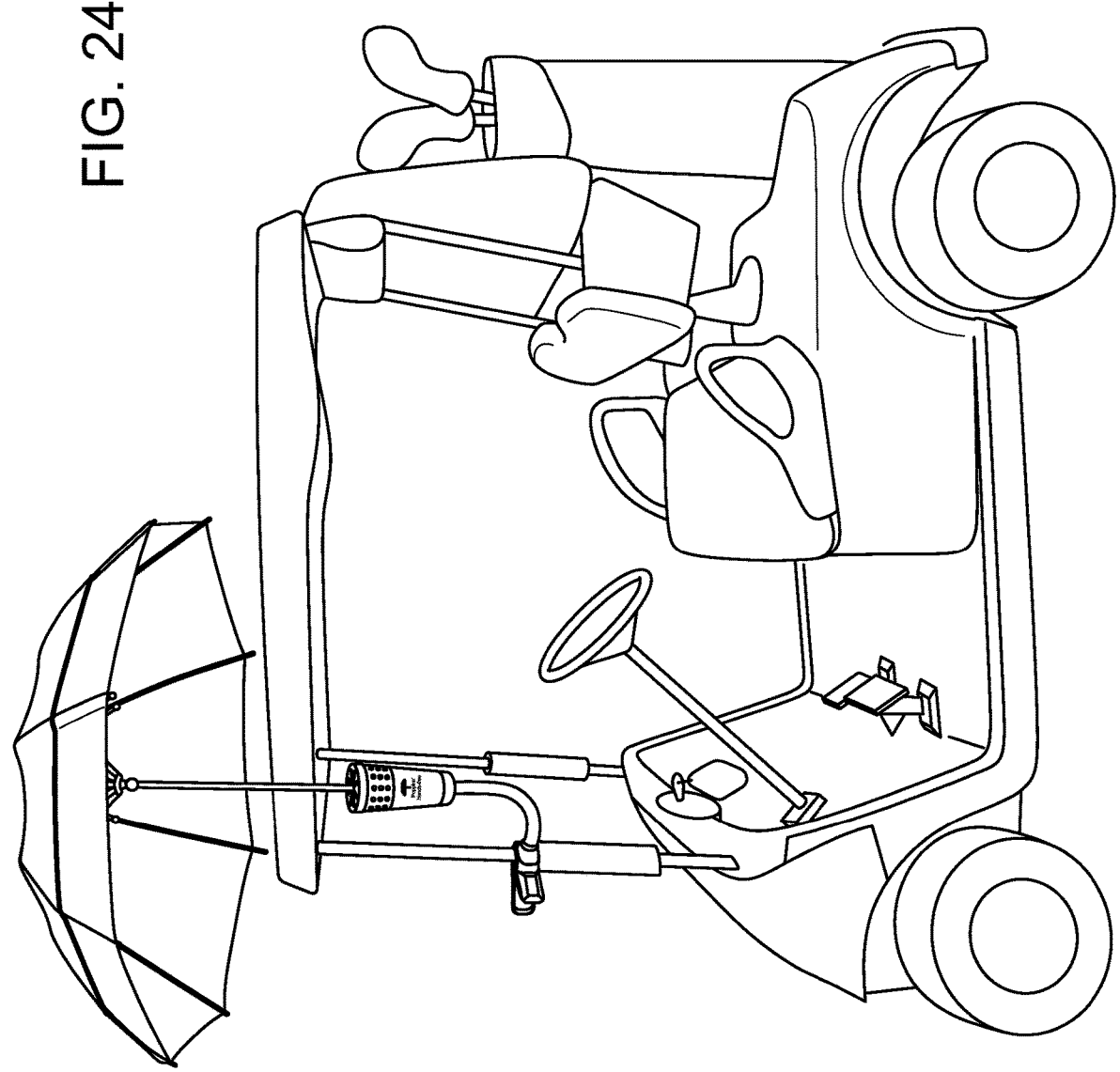
FIG. 24 illustrates an exemplary application of the mounting device shown in FIG. 23 to a golf cart.
Figure 25:
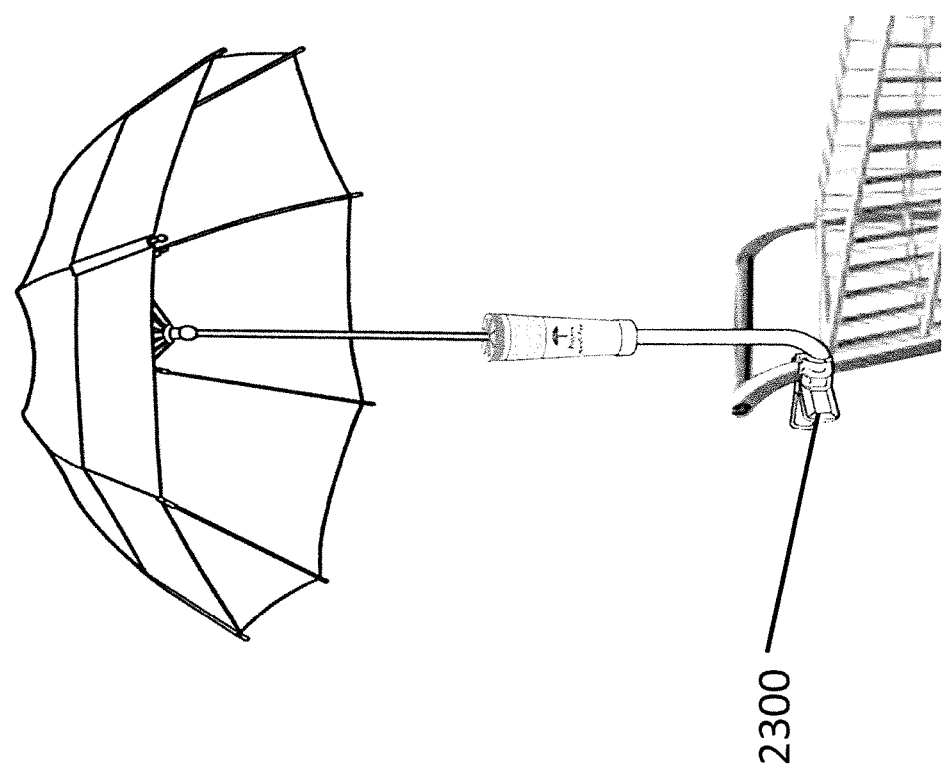
FIG. 25 illustrates an exemplary application of the mounting device shown in FIG. 23 to a shopping cart.

FIG. 24 illustrates the use of the gripping member 2300 to attached the holder 100 to a frame part of a golf cart. FIG. 25 illustrates the use of the gripping member 2300 to secure the holder 100 to a shopping cart.

Figure 26:
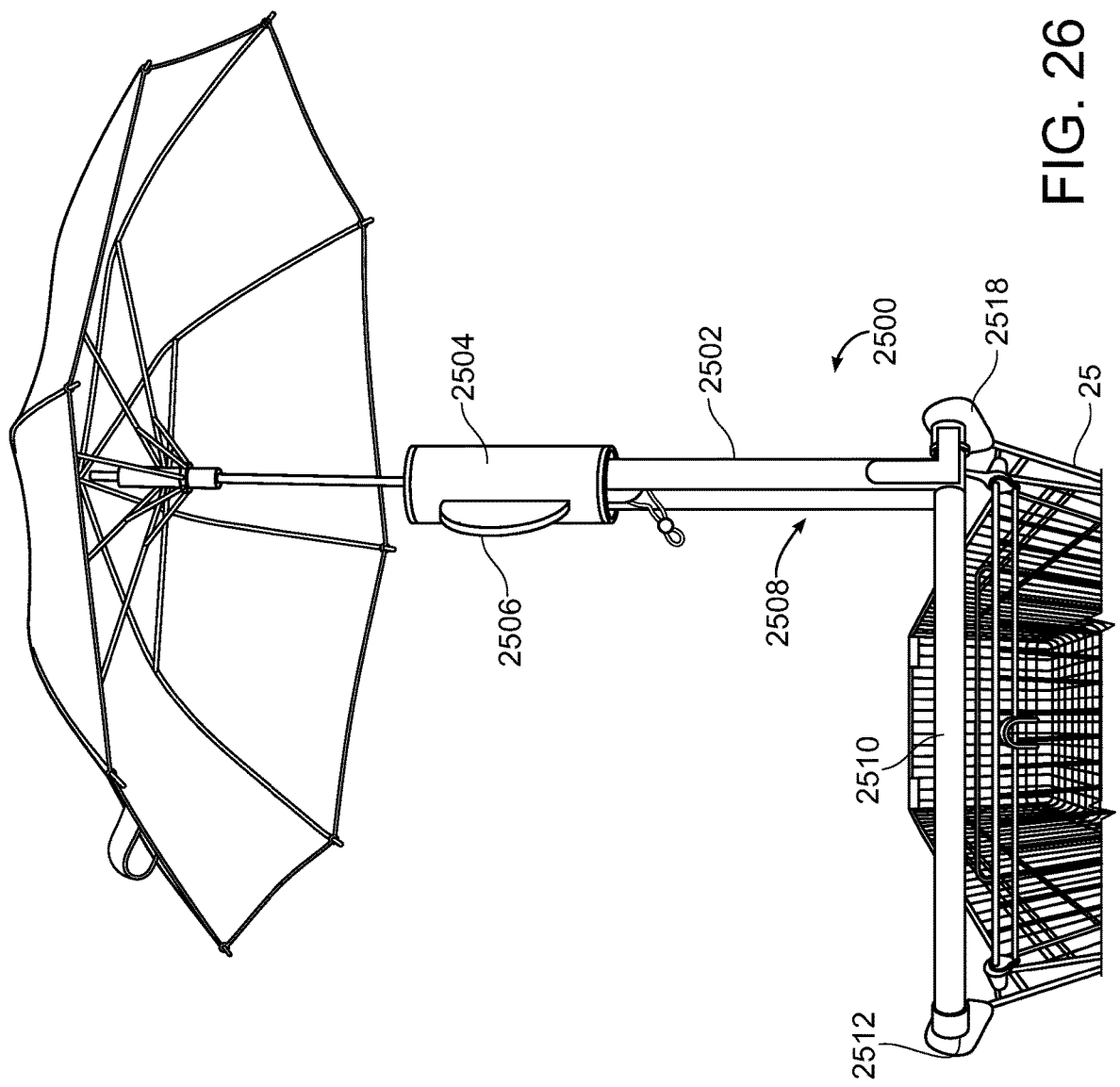
FIGS. 26-29 illustrates a shopping cart application of a hands-free umbrella holder incorporating aspects of the disclosed embodiments.

The aspects of the disclosed embodiments also contemplate the use of the umbrella handle holder 100 of the disclosed embodiment in conjunction with a shopping cart. One example is illustrated in FIG. 26. As is shown in FIG. 26, in this example, the umbrella handle holder 2500 includes a handle holder member 2504 and an arm member 2502. The handle holder member 2504 is configured to receive the handle of an umbrella as is generally described herein with respect to the umbrella handle holder 100.

Figure 29:
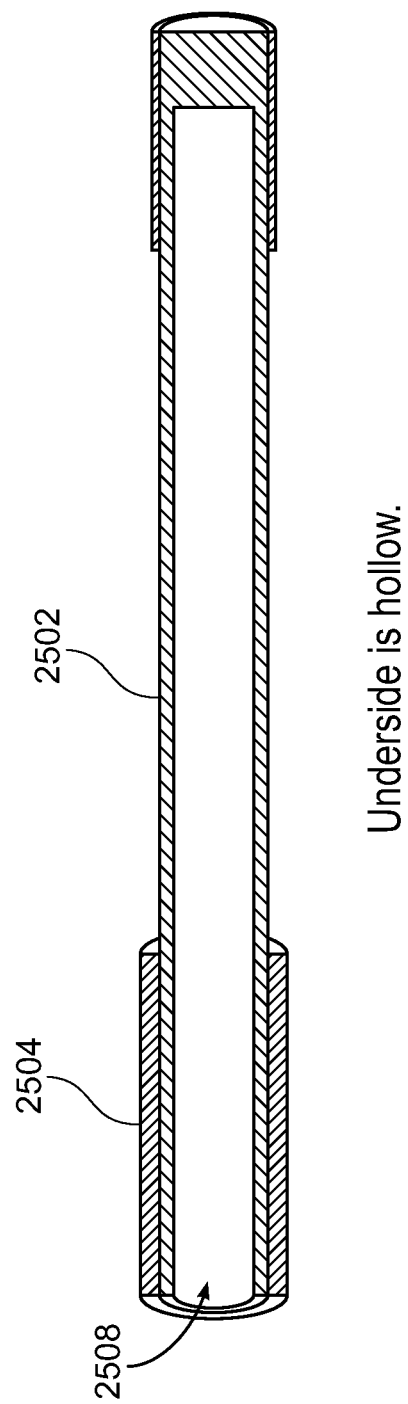

Referring also to FIGS. 26-29, in an initial state, the umbrella handle holder 2500 is disposed over the handle 2510 of the shopping cart 25. As illustrated in FIG. 29 for example, the underside 2508 of the umbrella handle holder 2500 is hollow. At least a portion of the handle holder member 2504 can be configured to rotate to cover the hollow underside in the area of the handle 2510 covered by the handle holder member 2504 to secure the member 2504 to the handle 2510. In one embodiment, the handle holder member 2510 includes or comprises a rotating or slidable sleeve member that can be rotated around the handle of the shopping cart. The slidable sleeve member can be disposed internally to the holder 2504 and slides out when the holder 2504 is rotated in a certain direction. This allows the underside of the umbrella handle holder 2500 to accommodate the handle 2510 of the shopping cart 25 and engage the shopping cart handle in a secure position. In one embodiment, the umbrella handle holder 2500 is configured to be maintained in a locked position in the state shown in FIG. 28.

Figure 27:
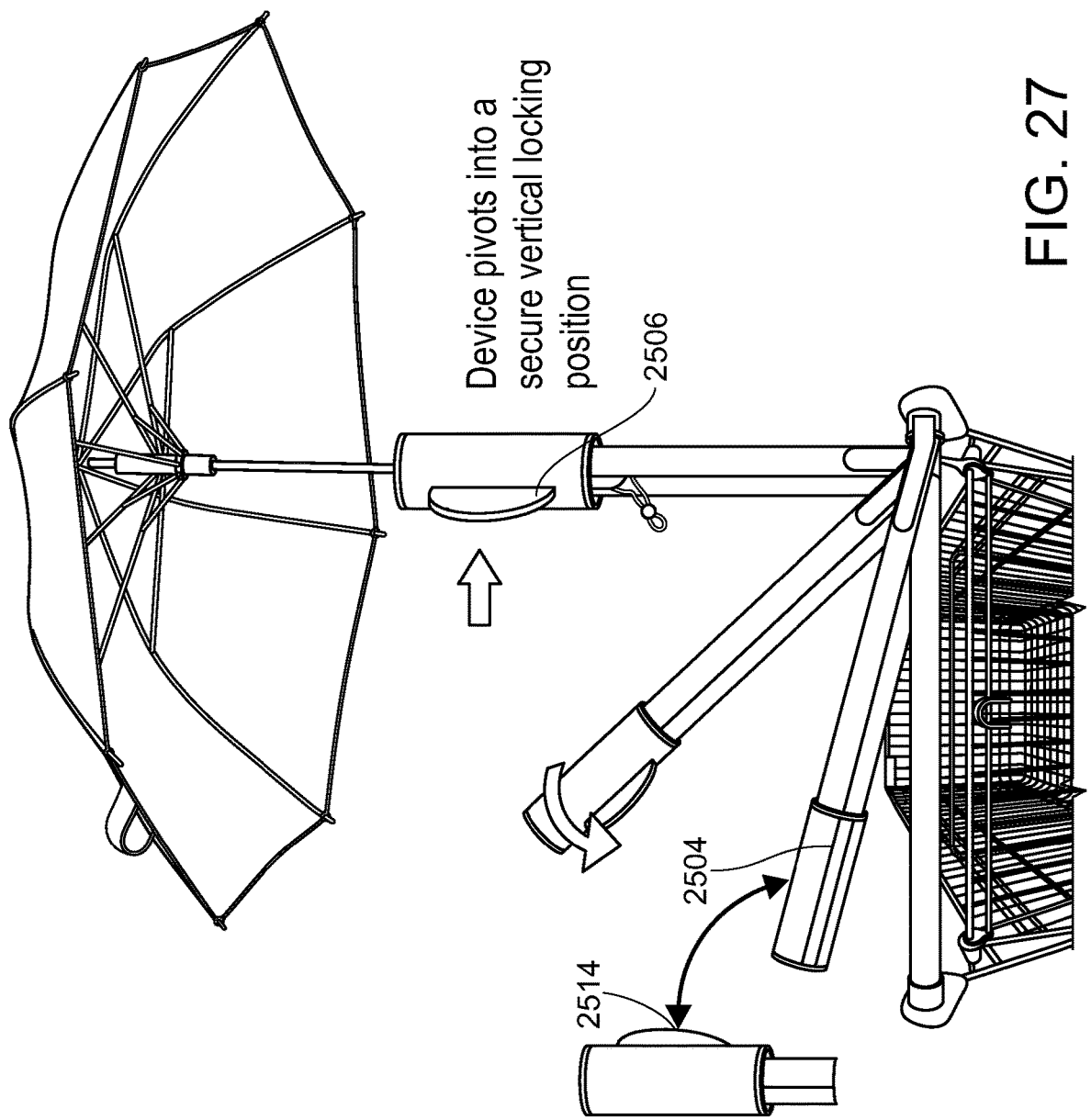
Figure 28:
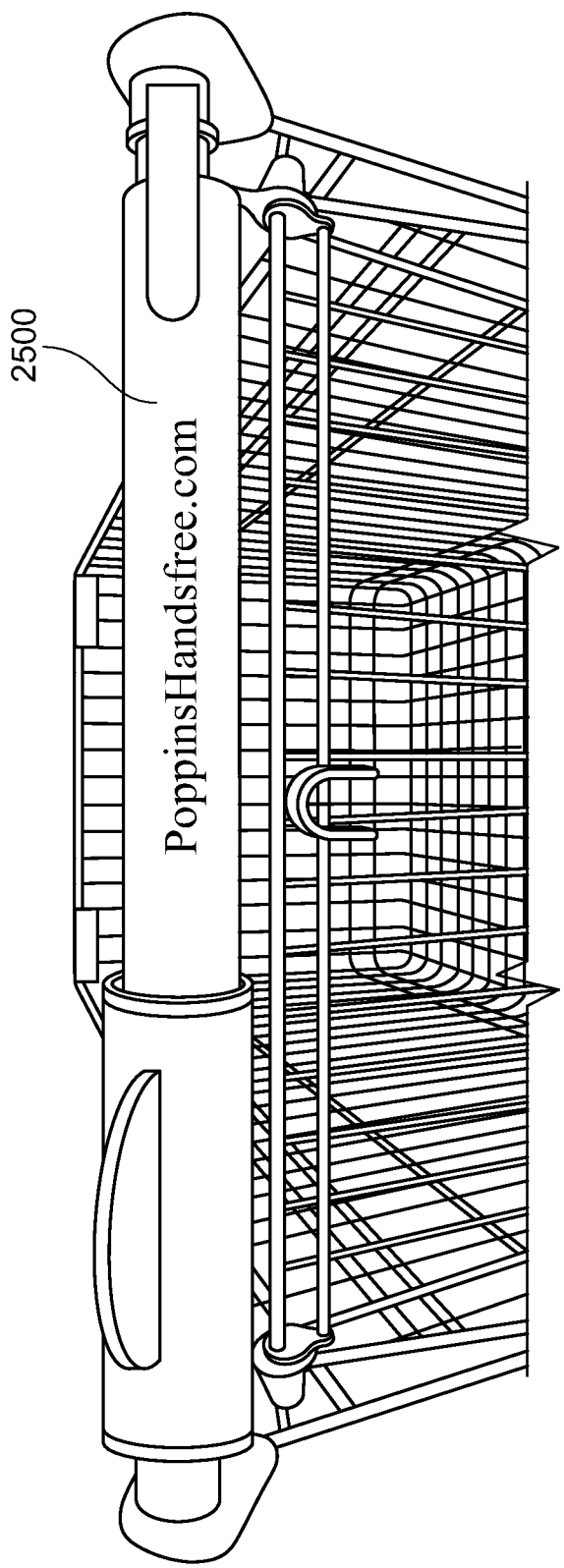

Referring to FIG. 27, to use the umbrella handle holder 2500 the user pulls up on the left-hand side 2504 of the holder 2500. The left-hand side 2504 is also referred to as the handle holder member. In one embodiment the handle holder member 2504 is configured to be rotated to cover or uncover the hollow member 2508. In the example of FIG. 27, a tab member 2514 is disposed on the handle holder member 2504 to facilitate the rotating of the handle holder member. The rotation of the handle holder member 2504 facilitates the covering of the hollow area and creates a complete cylinder or cup. The handle holder member 2504 can be rotated until it or the sleeve member locks in place.

The right hand side of the holder 2500 includes a pivot member 2518. This allows the arm member 2502 to be rotated to and between the horizontal and vertical positions. Once the handle member 2504 is released from the cart handle 2510, the arm member 2502 can be raised and locked into a vertical position as illustrated in FIGS. 26 and 27.

While in the vertical position an umbrella can be inserted into the top of the handle holder member 2504, which generally comprises the holder 100 incorporating aspects of the disclosed embodiments. In one embodiment, a tab member 2506 can be pushed in to secure the umbrella handle in the handle holder member 2504. The tab member 2506 can be pulled out to release the umbrella handle.

Figure 30:
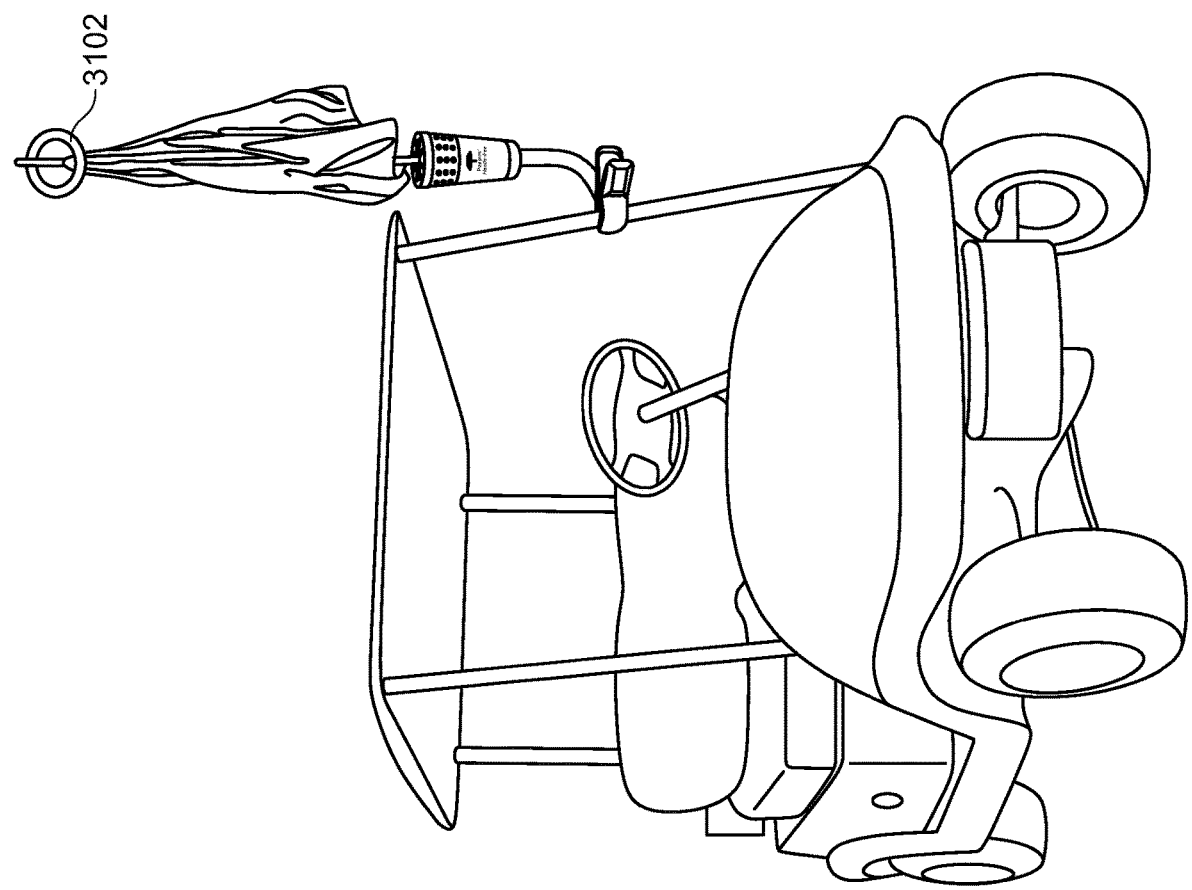
FIGS. 30-31 illustrate the use of a ring member to secure an umbrella in accordance with aspects of the disclosed embodiments.
Figure 31:
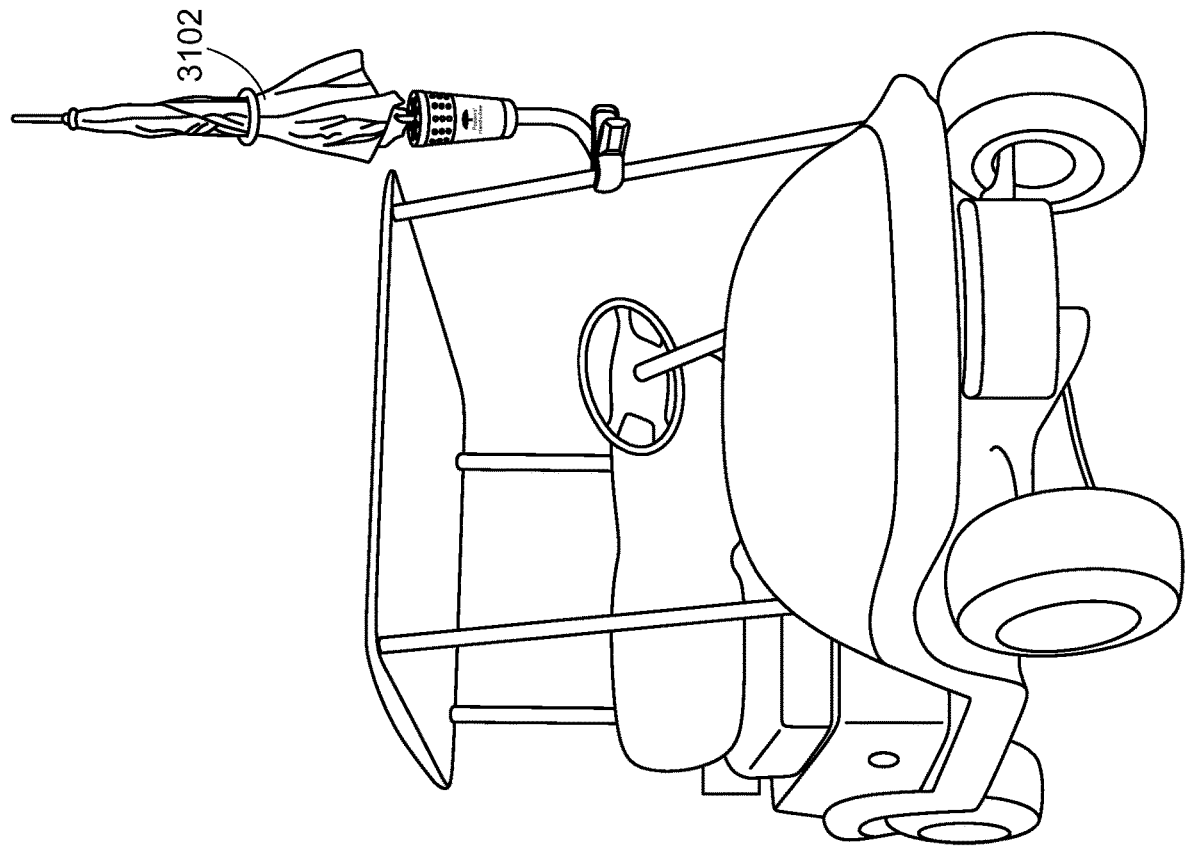
Figure 32:
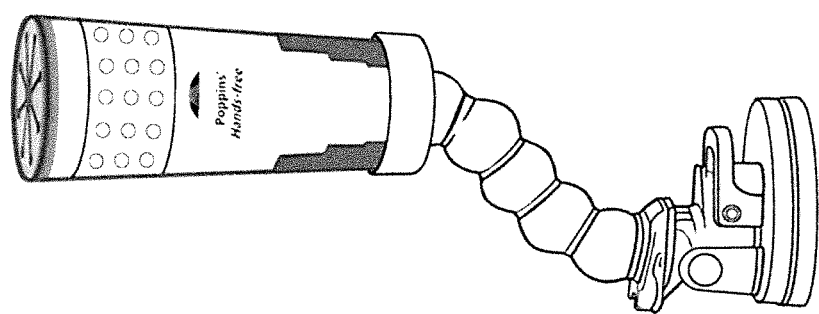
FIG. 32 illustrates an exemplary mounting application for the umbrella handle holder of the disclosed embodiments.

Referring to FIGS. 30 and 31, in one embodiment, the umbrella can be temporarily secured in the holder 100 while the vehicle to which the holder 100 is attached is moving. For example, the umbrella holder 100 can include a ring member 3102 that is configured to slide over a closed umbrella while the handle of the umbrella is secured in the holder 100. This can allow for movement of the vehicle, such a car or golf cart, at a low or safe speed and a short distance, without the need to remove the umbrella from the holder 100. Another option is to invert the closed umbrella and insert the top end of the closed umbrella into the holder 100 for lite travel or movement.

Another application of the umbrella handle holder of the disclosed embodiments is to support the four corner poles or posts of a light tent. For example, in one embodiment, when the umbrella handle holder of the disclosed embodiments is attached to a vehicle or even a golf cart, as is generally described herein, a pole of a tent, canopy or awning can be inserted and retained in the umbrella handle holder. If the vehicles are suitably arranged to correspond to the positions of the corners of the tent, or where the tent poles are arranged, the poles of the tent can be inserted into a respective umbrella handle holder. In this manner, the tent, canopy or awning can be arranged to provide a cover or protected area in an area defined by the vehicles. An example of the application use would include but not be limited to tailgating, camping, etc.

The aspects of the disclosed embodiments are directed to an umbrella handle or pole holder device that is portable. With a variety of mounting and armature systems, the device of the disclosed embodiments will allow consumers, shoppers, golfers, contractors, livery service providers, commuters, tailgaters, campers, Senior Living Community members and management; University or Business Campus Security and Property Management; food delivery; and more to 'dock' an umbrella while remaining protected; move about; and most importantly able to use both hands to perform tasks outside during inclement weather. In practice the holder 100 allows for a hands-free umbrella experience to perform tasks outside during inclement weather.

The device of the disclosed embodiments can temporarily mounted on vehicle glass/window (inside or outside vehicle); and on roof or body of vehicle or a golf cart. In another application, the device of the disclosed embodiments can be permanently mounted on a Golf Cart Roof as part of new cart manufacturing design; or an after-market add-on. Further, golf cart frame-mounting and shopping cart frame mounting options include both permanent or portable attachment mechanisms. The device of the disclosed embodiments can also be configured to be permanently mounted on a shopping cart as part of new shopping cart design; or as an after-market add-on. The device can also including printing and advertising, if desired.

Thus, while there have been shown, described and pointed out, fundamental novel features of the invention as applied to the exemplary embodiments thereof, it will be understood that various omissions, substitutions and changes in the form and details of apparatus and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hands-free umbrella handle holder, comprising:
a base member;
top member;
an interior member; and
a connecting member,
   wherein the base member is configured to be connected to the connecting member and the connecting member is configured to be connected to an object;
   the top member includes a central opening and slotted members that extend away from and surround the central opening, the top member configured to receive an umbrella handle;
   the interior member comprises a stepped interior member that is configured to receive and retain the umbrella handle, the top member and stepped interior member configured to retain the umbrella handle in a secure position; and wherein
   an interior of the base member further comprises an interlocking base assembly that is disposed below the stepped interior member, the interlocking base assembly comprising:
      a first member, the first member comprising a raised portion and a recessed portion, wherein boundary between the raised portion and the recessed portion is curved; and
      a cap member, the cap member being configured to be attached to an end of the umbrella handle, the cap member comprising a raised portion and a recessed portion, wherein a boundary between the raised portion and the recessed portion on the cap member is curved; and
   wherein an arrangement of the raised portion and the recessed portion of the first member is complementary to the raised portion and the recessed portion of the cap member, the arrangement configured to allow the cap member to engage with and interlock with the first member.

2. The hands-free umbrella handle holder according to claim 1, wherein the connecting member comprises a clip attachment.

3. The hands-free umbrella handle holder according to claim 1, wherein the connecting member comprises a magnet.

4. The hands-free umbrella handle holder according to claim 1, wherein the connecting member comprises a suction cup.

5. The hands-free umbrella handle holder according to claim 1, wherein the connecting member comprises a pivot member.

6. The hands-free umbrella handle holder according to claim 1, wherein the connecting member comprises a cup mount and a flexible arm, the base member being disposed in the cup mount, the cup mount being connected to one end of the flexible arm, an other end of the flexible arm configured to be connected to another connecting member that is connected to the object.

7. The hands-free umbrella handle holder according to claim 1, wherein the connecting member is a suction cup, a magnet, a clip or a pivot member.

8. The hands-free umbrella handle holder according to claim 1, wherein the connecting member is a plate member with a flexible member connected thereto, wherein one end of the flexible member is connected to the object and an other end of the flexible member comprises a slidable member that is disposed in a receiving groove in the plate member.

9. The hands-free umbrella handle holder according to claim 8, wherein the plate member further comprises a curved member that is configured to receive the umbrella handle holder in folded state.

10. The hands-free umbrella handle holder according to claim 1, wherein the top member is a flexible and resilient member.

11. The hands-free umbrella handle holder according to claim 1, wherein the stepped interior member is a removable insert.

12. The hands-free umbrella handle holder according to claim 1, wherein the object is a golf cart.

13. The hands-free umbrella handle holder according to claim 1, wherein the object is a shopping cart.

14. The hands-free umbrella handle holder according to claim 1, wherein the object is an automobile, SUV, or truck.

15. The hands-free umbrella handle holder according to claim 1, wherein the connecting member further comprises an arm member connected to the base member, the arm member including a hollow region that is configured to engage and be disposed over a handle of a shopping cart.

16. The hands-free umbrella handle holder according to claim 15 wherein the arm member further comprises a rotating sleeve that is configured to rotatably slide out of the arm member and around the handle of the shopping cart.

17. The hands-free umbrella handle holder according to claim 16 wherein one end of the arm member comprises a pivot member that is secured to the handle of the shopping cart and is configured to allow the arm member to be moved to a raised position.

18. The hands-free umbrella handle holder according to claim 1, wherein the connecting member further comprises:
 an arm member, the arm member including a hollowed portion that is configured to be disposed over at least a portion of a handle of a shopping cart;
 a pivot member disposed at an end of the arm member, the pivot member being configured to be connected to the handle of the shopping cart in a pivotable manner and enable the arm member to be moved between an upright position and a storage position; and
 a sleeve member disposed in connection with at least a portion of the arm member, the sleeve member being configured, in the storage position of the arm member, to rotate in a first direction around the handle of the shopping cart to secure the arm member to the handle of the shopping cart and rotate in a second direction to uncover the handle.

19. The hands-free umbrella handle holder according to claim 1, wherein the umbrella handle is configured to be twisted to lock the cap member with the first member.

* * * * *